United States Patent
Eklöf et al.

(10) Patent No.: US 12,082,068 B2
(45) Date of Patent: Sep. 3, 2024

(54) HANDLING OF MEASUREMENT CONFIGURATION UPON CONDITIONAL MOBILITY EXECUTION

(71) Applicant: Telefonaktiebolaget LM Ericsson (publ), Stockholm (SE)

(72) Inventors: Cecilia Eklöf, Täby (SE); Icaro L. J. Da Silva, Solna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/426,271

(22) PCT Filed: Jan. 29, 2020

(86) PCT No.: PCT/SE2020/050071
§ 371 (c)(1),
(2) Date: Jul. 28, 2021

(87) PCT Pub. No.: WO2020/162811
PCT Pub. Date: Aug. 13, 2020

(65) Prior Publication Data
US 2022/0022121 A1    Jan. 20, 2022

(51) Int. Cl.
*H04W 36/32*  (2009.01)
*H04W 36/00*  (2009.01)

(52) U.S. Cl.
CPC ....... *H04W 36/32* (2013.01); *H04W 36/0058* (2018.08); *H04W 36/00837* (2018.08); *H04W 36/0094* (2013.01)

(58) Field of Classification Search
None
See application file for complete search history.

(56) References Cited

U.S. PATENT DOCUMENTS

| | | | |
|---|---|---|---|
| 9,491,674 | B2 | 11/2016 | Singh et al. |
| 9,629,171 | B2 | 4/2017 | Roy et al. |

(Continued)

FOREIGN PATENT DOCUMENTS

| | | | | |
|---|---|---|---|---|
| CN | 110557792 | A | * 12/2019 | ............ H04W 24/02 |
| CN | 107079318 | B | 8/2020 | |

(Continued)

OTHER PUBLICATIONS

"3GPP TS 23.501 V15.4.0", 3rd Generation Partnership Project; Technical Specification Group Services and System Aspects; System Architecture for the 5G System; Stage 2 (Release 15), Dec. 2018, pp. 1-236.

(Continued)

*Primary Examiner* — Liem H. Nguyen
(74) *Attorney, Agent, or Firm* — Murphy, Bilak & Homiller, PLLC

(57) ABSTRACT

Embodiments include methods for conditional mobility in a radio access network (RAN), performed by a user equipment (UE). Such methods include receiving, from one or more RAN nodes (e.g., source RAN node and/or target RAN node), one or more mobility-related messages that include: a first indication of a mobility operation; a second indication of a triggering condition for the mobility operation; a second measurement configuration related to the triggering condition; and a third measurement configuration related to one or more target cells. Such methods also include, based on the second measurement configuration, detecting fulfillment of the triggering condition with respect to a particular one of the target cells and executing the mobility operation towards the particular target cell, and subsequently performing and reporting third measurements in the particular target cell based on the third measurement configuration. Embodi- (Continued)

ments also include complementary methods performed by source RAN nodes and target RAN nodes.

21 Claims, 21 Drawing Sheets

(56) References Cited

U.S. PATENT DOCUMENTS

| | | | |
|---|---|---|---|
| 2009/0046656 A1 | 12/2009 | Kitazoe et al. | |
| 2017/0026882 A1* | 1/2017 | Centonza | H04W 28/18 |
| 2017/0118690 A1 | 4/2017 | Patel et al. | |
| 2017/0238275 A1 | 8/2017 | De Pasquale et al. | |
| 2018/0279193 A1* | 9/2018 | Park | H04W 36/26 |
| 2019/0387438 A1 | 12/2019 | Chang et al. | |
| 2019/0387440 A1* | 12/2019 | Yiu | H04W 36/165 |
| 2020/0022042 A1* | 1/2020 | Yin | H04W 36/00837 |
| 2020/0077314 A1* | 3/2020 | Hwang | H04W 36/08 |
| 2020/0187069 A1 | 6/2020 | Hong et al. | |
| 2020/0196205 A1* | 6/2020 | Kim | H04W 36/36 |
| 2021/0045031 A1* | 2/2021 | Lee | H04W 36/22 |
| 2021/0058838 A1* | 2/2021 | Lee | H04W 36/0058 |
| 2022/0030483 A1* | 1/2022 | Cheng | H04W 36/0058 |
| 2022/0070752 A1* | 3/2022 | Kim | H04W 36/32 |
| 2022/0322175 A1* | 10/2022 | Liu | H04W 36/22 |
| 2023/0345321 A1* | 10/2023 | Zhang | H04W 36/00837 |

FOREIGN PATENT DOCUMENTS

| | | |
|---|---|---|
| EP | 3562208 A1 | 10/2019 |
| EP | 3609231 A1 | 2/2020 |
| JP | 2014232992 A | 12/2014 |
| KR | 20180122935 A | 11/2018 |
| KR | 20180122963 A | 11/2018 |
| RU | 2454001 C2 | 6/2012 |
| WO | 2014074314 A1 | 5/2014 |
| WO | 2016055095 A1 | 4/2016 |
| WO | 2017125591 A1 | 7/2017 |
| WO | 2018083649 A1 | 5/2018 |
| WO | 2018113655 A1 | 6/2018 |
| WO | 2018132051 A1 | 7/2018 |
| WO | 2018156696 A1 | 8/2018 |
| WO | 2018174609 A2 | 9/2018 |
| WO | 2018175721 A1 | 9/2018 |
| WO | 2018175819 A1 | 9/2018 |
| WO | 2018194326 A1 | 10/2018 |
| WO | 2018203716 A1 | 11/2018 |
| WO | 2019004893 A1 | 1/2019 |
| WO | 2020091667 A1 | 5/2020 |

OTHER PUBLICATIONS

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.

"3GPP TS 38.420 V15.1.0", 3rd Generation Partnership Project; Technical Specification Group Radio Access Network; NG-RAN; Xn general aspects and principles (Release 15), Sep. 2018, pp. 1-14.

"3GPP TS 38.423 V15.1.0", 3rd Generation Partnership Project; Technical Specification Group Radio Access Network; NG-RAN; Xn application protocol (XnAP) (Release 15), Sep. 2018, pp. 1-263.

"3GPP TS 38.473 V15.3.0", 3rd Generation Partnership Project; Technical Specification Group Radio Access Network; NG-RAN; F1 application protocol (F1AP) (Release 15), Sep. 2018, pp. 1-176.

"3GPP TS 38.331 V15.4.0", 3rd Generation Partnership Project; Technical Specification Group Radio Access Network; NR; Radio Resource Control (RRC) protocol specification (Release 15), Dec. 2018, pp. 1-474.

"Handling of a HO command while UE is monitoring CHO", 3GPP TSG-RAN WG2#108, Tdoc R2-1914635, Reno, Nevada, USA, Nov. 18-22, 2019, pp. 1-9.

"3GPP TS 38.473 V15.4.1", 3rd Generation Partnership Project; Technical Specification Group Radio Access Network; NG-RAN; F1 application protocol (F1AP) (Release 15), Jan. 2019, pp. 1-192.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"Introduction of Conditional handover", 3GPP TSG-RAN2 AH-1801, R2-1801493, Vancouver, Canada, Jan. 22-26, 2018, pp. 1-5.

"Remaining essential issue for NR SA Handover", 3GPP TSG-RAN2#102, R2-1808482, Busan, Korea, (Revision of R2-1806445), May 21-25, 2018, pp. 1-12.

"Analysis on conditional handover", 3GPP TSG-RAN WG2 #97bis, R2-1703384, Spokane, USA, Apr. 3-7, 2017, pp. 1-7.

"3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, pp. 1-918.

"3GPP TS 38.331 V15.3.0", 3rd Generation Partnership Project; Technical Specification Group Radio Access Network; NR; Radio Resource Control (RRC) protocol specification (Release 15), Sep. 2018, pp. 1-445.

"3GPP TS 36.331 V15.10.0", 3rd Generation Partnership Project; Technical Specification Group Radio Access Network; Evolved Universal Terrestrial Radio Access (E-UTRA); Radio Resource Control (RRC); Protocol specification (Release 15), Jul. 2020, pp. 1-965.

"Robust handover via early handover command", 3GPP TSG-RAN WG2 #95bis, Tdoc R2-166928 Kaohsiung, Taiwan, Oct. 10-14, 2016, pp. 1-4.

* cited by examiner

```
-- ASN1START
-- TAG-RRCRESUME-START
RRCResume ::=                       SEQUENCE {
    rrc-TransactionIdentifier       RRC-TransactionIdentifier,
    criticalExtensions              CHOICE {
        rrcResume                       RRCResume-IEs,
        criticalExtensionsFutur         SEQUENCE { }
    }
}
RRCResume-IEs ::=                   SEQUENCE {
    radioBearerConfig               RadioBearerConfig           OPTIONAL,    -- Need M
    masterCellGroup                 OCTET STRING (CONTAINING CellGroupConfig)
                                                                OPTIONAL,    -- Need M
    measConfig                      MeasConfig                  OPTIONAL,    -- Need M
    fullConfig                      ENUMERATED {true}           OPTIONAL,    -- Need N
    lateNonCriticalExtension        OCTET STRING                OPTIONAL,
    nonCriticalExtension            SEQUENCE{ }                 OPTIONAL
}
```

FIG. 6A

```
-- ASN1START
-- TAG-MEASCONFIG-START
MeasConfig ::=                      SEQUENCE {
    measObjectToRemoveList          MeasObjectToRemoveList      OPTIONAL,    -- Need N
    measObjectToAddModList          MeasObjectToAddModList      OPTIONAL,    -- Need N
    reportConfigToRemoveList        ReportConfigToRemoveList    OPTIONAL,    -- Need N
    reportConfigToAddModList        ReportConfigToAddModList    OPTIONAL,    -- Need N
    measIdToRemoveList              MeasIdToRemoveList          OPTIONAL,    -- Need N
    measIdToAddModList              MeasIdToAddModList          OPTIONAL,    -- Need N
    s-MeasureConfig                 CHOICE {
        ssb-RSRP                        RSRP-Range,
        csi-RSRP                        RSRP-Range
    }                                                           OPTIONAL,    -- Need M
    quantityConfig                  QuantityConfig              OPTIONAL,    -- Need M
    measGapConfig                   MeasGapConfig               OPTIONAL,    -- Need M
    measGapSharingConfig            MeasGapSharingConfig        OPTIONAL,    -- Need M
    ...
}
MeasObjectToRemoveList ::=   SEQUENCE(SIZE(1..maxNrofObjectId)) OF MeasObjectId
MeasIdToRemoveList ::=       SEQUENCE(SIZE(1..maxNrofMeasId)) OF MeasId
ReportConfigToRemoveList ::= SEQUENCE(SIZE(1..maxReportConfigId)) OF ReportConfigId
-- TAG-MEASCONFIG-STOP
-- ASN1STOP
```

FIG. 6B

```
-- ASN1START
-- TAG-VARMEASCONFIG-START
VarMeasConfig ::=  SEQUENCE {                              -- Measurement identities
    measIdList      MeasIdToAddModList         OPTIONAL,   -- Measurement objects
    measObjectList  MeasObjectToAddModList     OPTIONAL,   -- Reporting configurations
    reportConfigList ReportConfigToAddModList  OPTIONAL,   -- Other parameters
    quantityConfig  QuantityConfig             OPTIONAL,
    s-MeasureConfig CHOICE {
        ssb-RSRP        RSRP-Range,
        csi-RSRP        RSRP-Range
    }                                          OPTIONAL
}
-- TAG-VARMEASCONFIG-STOP
-- ASN1STOP
```

FIG. 6C

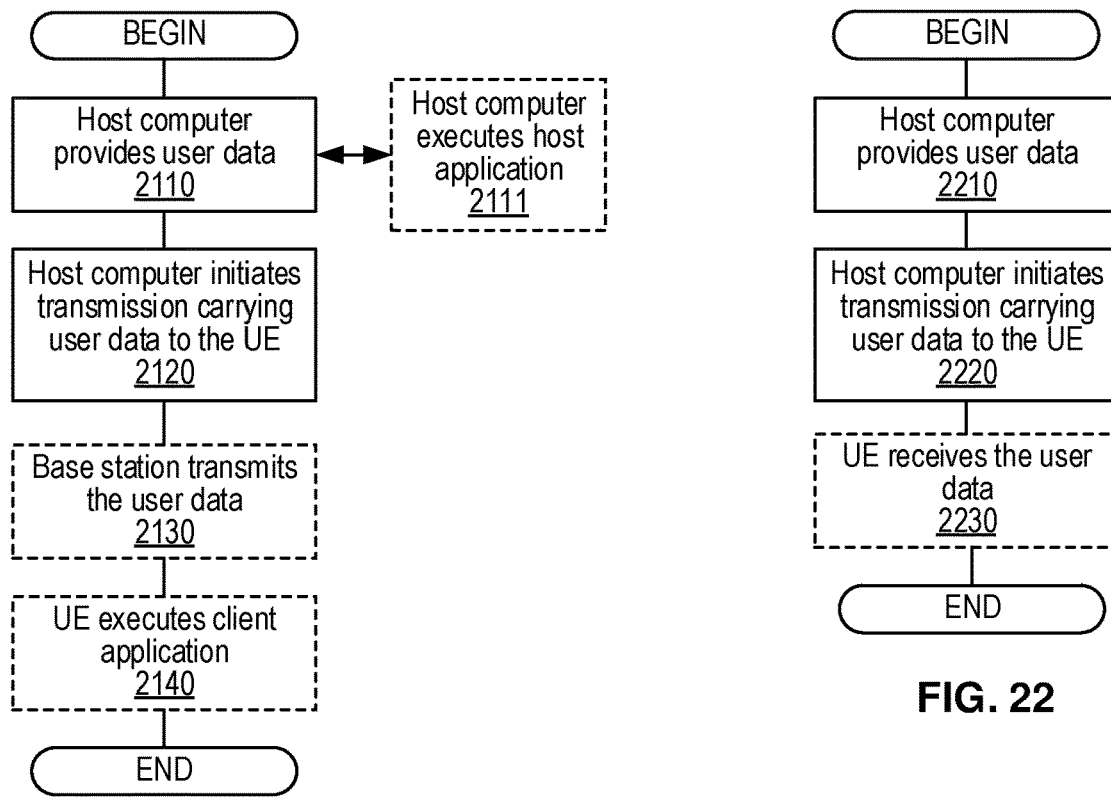
FIG. 21
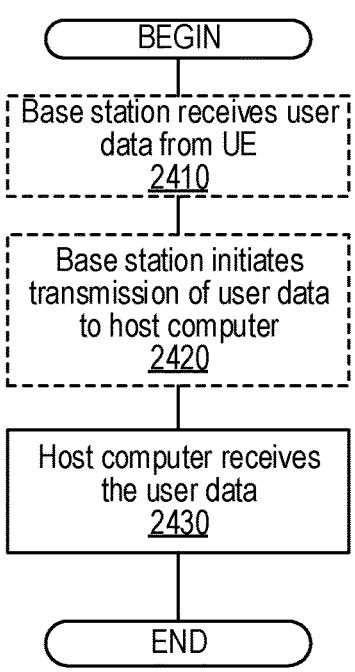
FIG. 22
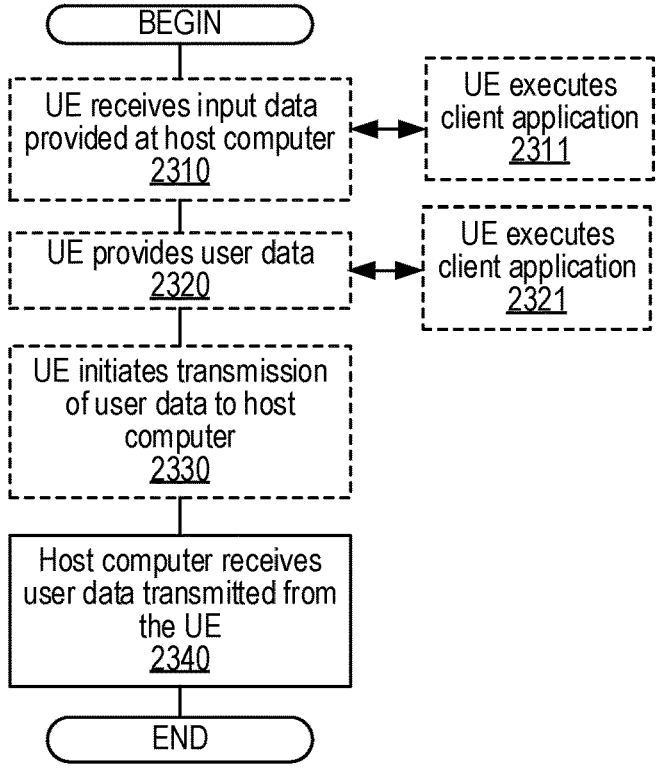
FIG. 23
FIG. 24

HANDLING OF MEASUREMENT CONFIGURATION UPON CONDITIONAL MOBILITY EXECUTION

TECHNICAL FIELD

The present application relates generally to the field of wireless communications, and more specifically to devices, methods, and computer-readable media that improve mobility operations of wireless devices or user equipment (UEs) in a wireless network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNBS), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are non-standardized (i.e., vendor-specific), such that encrypted credentials stored in EPC-UDR 135 are often inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

Downlink (i.e., network node to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to network node) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the network node in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

Furthermore, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

The LTE FDD uplink (UL) radio frame is configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the PHY resources. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for network node DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

Since LTE-release 8, three Signaling Radio Bearers (SRBs), namely SRB0, SRB1 and SRB2 have been available for the transport of RRC and Non Access Stratum (NAS) messages between the UE and network node. A new SRB, known as SRB1bis, was also introduced in rel-13 for supporting DoNAS (Data Over NAS) in NB-IoT. SRB0 is for RRC messages using the CCCH logical channel, and it is used for handling RRC connection setup, RRC connection resume and RRC connection re-establishment. Once the UE is connected to the network node (i.e., RRC connection setup or RRC connection reestablishment/resume has succeeded), SRB1 is used for handling RRC messages (which may include a piggybacked NAS message) as well as for NAS messages prior to the establishment of SRB2, all using DCCH logical channel. On the other hand, SRB2 is used for RRC messages, including logged measurement information as well as for NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

As briefly mentioned above, the LTE RRC layer (shown in FIGS. 2B-C) controls communications between a UE and an eNB at the radio interface, as well as the mobility of a UE between cells in the E-UTRAN. A common mobility procedure for UEs in RRC_CONNECTED state (e.g., with an active connection) is handover (HO) between cells. More specifically, a UE is handed over from a source or serving cell, provided by a source node, to a target cell provided by a target node. In general, for LTE, handover source and target nodes are different eNBs, although intra-node handover between different cells provided by a single eNB is also possible.

The concept of "delta signalling" has been introduced in 3GPP standards to reduce the amount of RRC signalling between network and UE. In handovers, for example, the source node can provide the UE's current RRC configuration to the target node. Given this information, when the target node prepares the RRC configuration to be used by the UE in the target cell after the handover, it needs to only signal the "delta" or the "difference" between the current UE configuration and the new one to be used in target cell. Such delta signalling is typically implemented with some protocol features such as "need codes," AddMod lists, and UE variables where received configurations are stored.

However, handover can have various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO command may not reach the UE in time (or at all) before the degraded connection with the source node (e.g., the node hosting the UE's current serving cell) is dropped.

Some "conditional mobility" techniques have been proposed to address these and other difficulties with handovers and other mobility procedures. Nevertheless, these proposed techniques suffer from various deficiencies—particularly related to the use of delta signalling—that make them unsuitable in various use cases, scenarios, and/or conditions.

SUMMARY

Accordingly, exemplary embodiments of the present disclosure address these and other mobility-related issues in wireless communication networks by providing improvements to mobility operations, such as handovers (including conditional handovers) between a source node (or cell) and a target node (or cell).

Exemplary embodiments of the present disclosure include methods (e.g., procedures) for conditional mobility in a radio access network (RAN). The exemplary method and/or procedure can be performed by a user equipment (UE, e.g., wireless device, MTC device, NB-IoT device, modem, etc. or component thereof) in communication with a network node (e.g., base station, eNB, gNB, etc., or components thereof) serving a cell in the RAN (e.g., E-UTRAN, NG-RAN).

In some embodiments, these exemplary methods can include receiving, from a source RAN node serving the UE's source cell, a first measurement configuration; storing the received first measurement configuration; and performing and reporting first measurements in the UE's source cell based on the first measurement configuration.

These exemplary methods can also include receiving, from the RAN, one or more mobility-related messages comprising: a first indication of a mobility operation; a second indication of a triggering condition for the mobility operation; a second measurement configuration related to a source cell; and a third measurement configuration related to one or more target cells. In some embodiments, the one or more mobility-related messages can include a conditional mobility command, received from a source node, comprising the first and second indications and the second and third measurement configurations. In addition, the second and third measurement configurations can include respective measurement configurations for each target cell that is a candidate for the indicated mobility operation.

In other embodiments, the one or more mobility-related messages can include a conditional mobility command, received from a source node, including the first and second indications and the second measurement configuration; and a reconfiguration message, received from a target node, comprising the third measurement configuration.

These exemplary methods can also include, based on the second measurement configuration, detecting fulfilment of the triggering condition with respect to a particular one of the target cells and executing the mobility operation towards the particular target.

In some embodiments, detecting fulfillment of the triggering condition can include performing second measurements in the source cell based on the second measurement configuration. In some embodiments, executing the mobility operation can include one or more of the following operations: stop performing second measurements based on the second measurement configuration; deleting or releasing at least a portion of a stored second measurement configuration; and storing the third measurement configuration.

In some embodiments, the third measurement configuration can be received as a complete measurement configuration. In such embodiments, executing the mobility operation can include replacing a stored first measurement configuration with the third measurement configuration.

In other embodiments, the third measurement configuration can be received as a delta with respect to the first measurement configuration and/or the second measurement configuration. In such embodiments, executing the mobility operation can include determining a measurement configuration, for the third measurements, based on the third measurement configuration and one or more of the first measurement configuration and the second measurement configuration.

In some embodiments, such as when the one or more mobility-related messages include a conditional mobility command and a reconfiguration message, executing the mobility operation can include performing and reporting third measurements in the particular target cell based on the second measurement configuration (e.g., received in the conditional mobility command), and subsequently receiving the reconfiguration message comprising the third measurement configuration (e.g., in the reconfiguration message).

These exemplary methods can also include performing and reporting third measurements in the particular target cell based on the third measurement configuration.

Other exemplary embodiments of the present disclosure include additional methods (e.g., procedures) for conditional mobility of a user equipment (UE) in a radio access network (RAN). These exemplary methods can be performed by a source RAN node (e.g., base station, eNB, gNB, etc., or component thereof) serving one or more user equipment (UEs, e.g., wireless devices, MTC devices, NB-IoT devices, modems, etc. or components thereof) in a cell of the RAN (e.g., E-UTRAN, NG-RAN).

In some embodiments, these exemplary methods can include sending, to the UE, a first measurement configuration related to a source cell, for the UE, that is served by the source RAN node; can receiving first measurements made by the UE in the source cell based on the first measurement configuration; and determining that a mobility operation is required for the UE, based on the first measurements.

These exemplary methods can also include sending, to a target node, a request to accept a mobility operation related to the UE (e.g., as determined above). In some embodiments, the request can include the first measurement configuration for the UE. These exemplary methods can also include receiving, from the target RAN node, a confirmation of the mobility operation, the confirmation including a third measurement configuration related to one or more target cells served by the target RAN node. These exemplary methods can also include determining a second measurement configuration related to a triggering condition for the mobility operation. For example, the second measurement configuration can be usable for detecting fulfilment of the triggering condition in the UE's source cell. In some embodiments, determining the second measurement configuration can also include sending the second measurement configuration to the target RAN node In some embodiments, at least one of the following conditions apply: the second measurement configuration is determined as a delta with respect to the first measurement configuration; the third measurement configuration is received as a delta with respect to the first measurement configuration; and the third measurement configuration is received as a delta with respect to the first and the second measurement configurations.

These exemplary method can also include sending, to the UE, a mobility-related message comprising: a first indication of the mobility operation; a second indication of the triggering condition; and the second measurement configuration. In some embodiments, the conditional mobility command can also include the third measurement configuration, and the second and third measurement configurations can include respective measurement configurations for each target cell that is a candidate for the indicated mobility operation.

In some embodiments, these exemplary methods can also include receiving, from the target RAN node, a third indication that the mobility operation has been completed; and in response to the third indication, deleting or releasing at least a portion of the stored first and second measurement configurations.

Other exemplary embodiments of the present disclosure include additional methods (e.g., procedures) for conditional mobility of a user equipment (UE) in a radio access network (RAN). These exemplary methods can be performed by a target RAN node (e.g., base station, eNB, gNB, etc., or component thereof) serving a cell of the RAN (e.g., E-UTRAN, NG-RAN).

These exemplary methods can include receiving, from a source RAN node, a request to accept a mobility operation related to the UE. The request can include a first measurement configuration for the UE. These exemplary methods can also include determining a third measurement configuration for the UE in relation to one or more target cells served by the target RAN node. The third measurement configuration can be based on (e.g., a delta with respect to) the first measurement configuration.

These exemplary methods can also include sending, to the source RAN node, a confirmation of the mobility operation, the confirmation including the third measurement configuration. In various embodiments, the third measurement configuration can be sent as a complete measurement configuration, or as a delta with respect to the first measurement configuration and/or the second measurement configuration. These exemplary methods can also include receiving, from the UE, measurements made in a particular one of the target cells based on the third measurement configuration.

In some embodiments, these exemplary methods can also include receiving measurements made by the UE for the particular target cell based on the second measurement configuration, and subsequently sending, to the UE, a reconfiguration message including the third measurement configuration.

In these embodiments, these exemplary methods can also include receiving, from the source RAN node, a second measurement configuration for the UE. The second measurement configuration can be received as a delta with respect to the first measurement configuration. In such embodiments, the third measurement configuration, included in the reconfiguration message, can be a delta with respect to the first measurement configuration and the second measurement configuration.

In some embodiments, these exemplary methods can also include sending, to the source RAN node, an indication that the mobility operation has been completed.

Other exemplary embodiments include user equipment (UEs, e.g., wireless devices, MTC devices, NB-IoT devices, modems, etc. or components thereof) and network nodes (e.g., base stations, gNBs, eNBs, etc. or components thereof) configured to perform operations corresponding to any of the exemplary methods described herein. Other exemplary embodiments include non-transitory, computer-readable media storing computer-executable instructions that, when executed by processing circuitry of a UE or a network node, configure such UEs or network nodes to perform operations corresponding to any of the exemplary methods described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIG. 6, which includes FIGS. 6A-6C, shows three exemplary ASN.1 data structures used for transferring and storing measurement configurations for a UE.

FIG. 7, which includes

FIG. 9, which includes

FIGS. 21-24 are flow diagrams of exemplary methods and/or procedures for transmission and/or reception of user data that can be implemented, for example, in the exemplary communication systems and/or networks illustrated in FIGS. 17-18.

DETAILED DESCRIPTION

Figure 1:
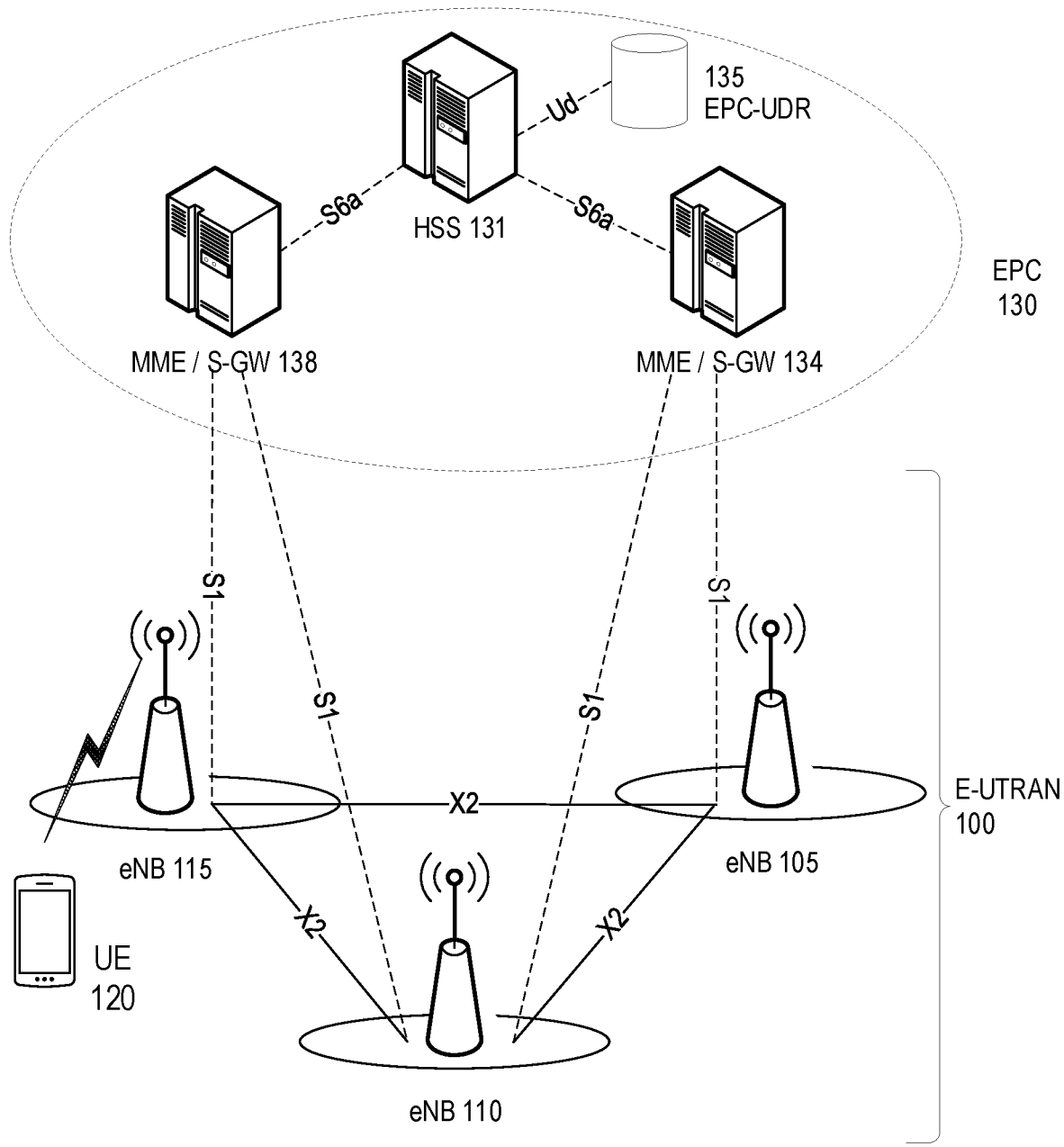
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
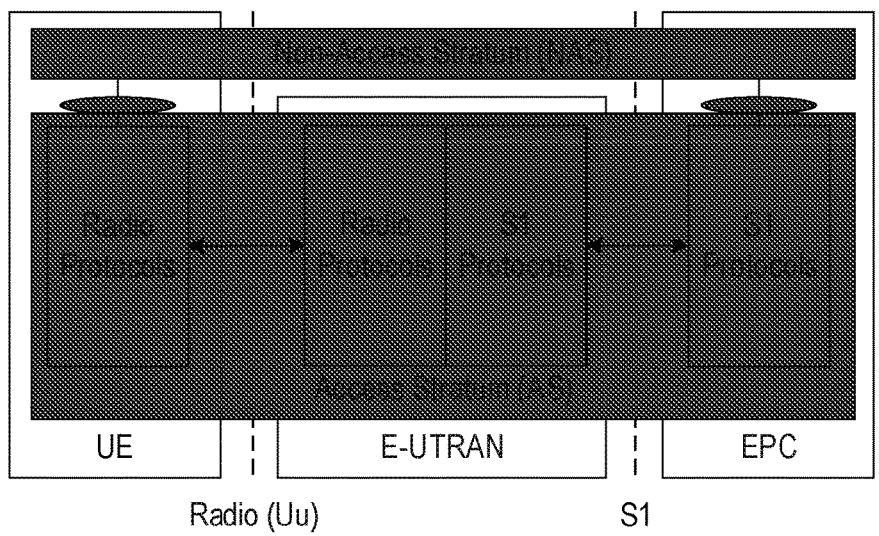
FIG. 2A is a high-level block diagram of an exemplary E-UTRAN architecture in terms of its constituent components, protocols, and interfaces.
Figure 2B:
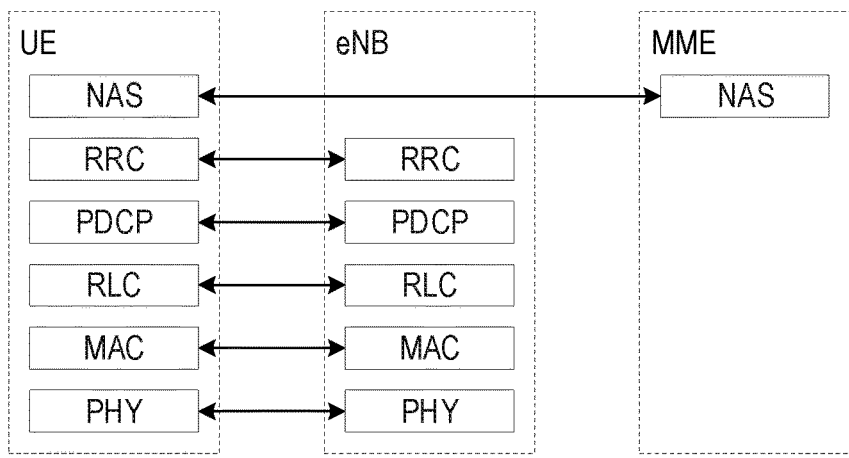
FIG. 2B is a block diagram of exemplary protocol layers of the control-plane portion of the radio (Uu) interface between a user equipment (UE) and the E-UTRAN.
Figure 2C:
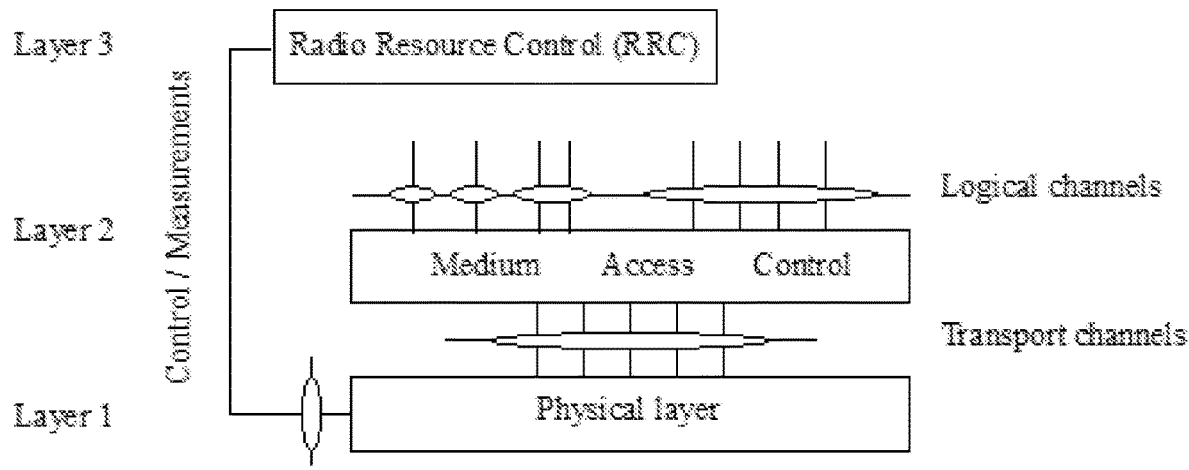
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (network node) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As discussed above, the current handover (HO) process in 3GPP networks has various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO Command may not reach the UE in time (or at all) before the degraded connection with the target node is dropped.

One solution to improve mobility robustness is called "conditional handover" ("CHO" for short) or "early handover command." In order to avoid the dependence on the serving radio link conditions at the time when the UE should execute the handover, the RRC signaling for the handover can be provided to the UE earlier, while conditions on the radio link are better. Such CHO RRC signaling can be based on delta signaling, discussed above, which provides similar advantages as for conventional (i.e., non-conditional) handover. Even so, the use of delta signalling can create various problems, inconsistencies, and/or issues during CHO operation, particularly when used for configuring UE measurements. These problems and specific improvements provided by exemplary embodiments of the present disclosure are discussed below in more detail.

Prior to Rel-13, there were two RRC states defined for a UE. More specifically, after a LTE is powered ON it will be in the RRC_IDLE state until an RRC connection is established, at which time it will transition to RRC_CONNECTED state (e.g., where data transfer can occur). After a connection is released, the UE returns to RRC_IDLE, In RRC_IDLE state, the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

In LTE Rel-13, a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "substate" of RRC_IDLE. Second, both the UE and the serving eNB store the UE's AS (e.g., S1-AP) context and RRC context after suspension. When the suspended UE needs to resume a connection (e.g., to send LI data), instead of going through the conventional service request procedure, the suspended UE merely sends an RRCConnectionResumeRequest message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier. Reducing the signaling can provide reduced UE latency (e.g. for smart phones accessing Internet) and reduced UE signaling, which can lead to reduced UE energy consumption, particularly for machine type communication (MTC) devices that send very little data (i.e., signaling being a primary consumer of energy).

To support mobility (e.g., handover or reselection) between cells and/or beams, a UE can perform periodic cell search and measurements of signal power and quality (e.g., reference signal received power, RSRP, and reference signal received quality, RSRQ) in both RRC_CONNECTED and RRC_IDLE modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN RS, UE-specific demodulation RS (DM-RS) associated with PDSCH, DM-RS associated with EPDCCH or M/NPDCCH, positioning RS (PRS), and channel state information RS (CSI-RS).

UE measurement reports to the network can be configured to be periodic or aperiodic based a particular event. For example, the network can configure a UE to perform measurements on various carrier frequencies and various radio access technologies (RATs) corresponding to neighbor cells, as well as for various purposes including, e.g., mobility and/or positioning. The configuration for each of these measurements is referred to as a "measurement object." Furthermore, the UE can be configured to perform the measurements according to a "measurement gap pattern" (or "gap pattern" for short), which can include a measurement gap repetition period (MGRP, i.e., how often a recurring gap is available for measurements) and a measurement gap length (MGL, i.e., the length of each recurring gap).

In LTE, the concept of Time-To-Trigger (TTT) is used to ensure that the event triggering criterion is satisfied for a long enough duration before a measurement report is sent by the UE. The triggering criterion and TTT are configured in a reportConfig message (or an information element, IE, of a message) sent by the network to the UE. The value of TTT provided in reportConfig is applicable to all neighbor cells of the UE that could trigger a measurement report based on the specified triggering criterion.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes one or more slots, and each slot includes 14 (for normal cyclic prefix) or 12 (for extended cyclic prefix) time-domain symbols.

Figure 3:
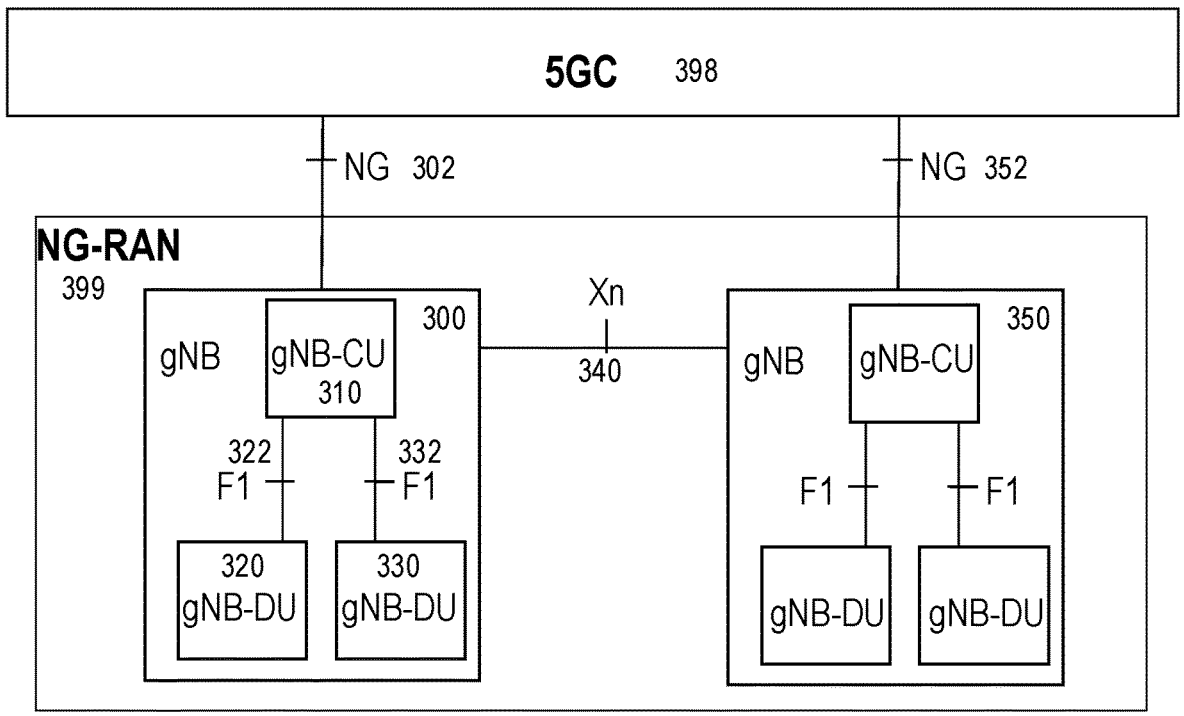
FIG. 3 illustrates a high-level view of the 5G network architecture, including split central unit (CU)-distributed unit (DU) split architecture of gNBs.

FIG. 3 illustrates a high-level view of the 5G network architecture, including a next generation RAN (NG-RAN) 399 and a 5G core network (5GC) 398. NG-RAN 399 can include one or more gNodeB's (gNBs) connected to the 5GC via one or more NG interfaces, such as gNBs 300, 350 connected via interfaces 302, 352, respectively. More specifically, gNBs 300, 350 can be connected to one or more Access and Mobility Management Functions (AMF) in the 5GC 398 via respective NG-C interfaces. Similarly, gNBs 300, 350 can be connected to one or more User Plane Functions (UPFs) in 5GC 398 via respective NG-U interfaces. NG-C and NG-U are control plane and user plane portions, respectively, of NG interfaces 302 and 352 shown in FIG. 3.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMES) in EPC via respective S1-C interfaces. Similarly, gNBs 300, 350 can connect to one or more Serving Gateways (SGWs) in EPC via respective NG-U interfaces.

In addition, the gNBs can be connected to each other via one or more Xn interfaces, such as Xn interface 340 between gNBs 300 and 350. The radio technology for the NG-RAN is often referred to as "New Radio" (NR). For the NR interface to UEs, each of the gNBs can support frequency division duplexing (FDD), time division duplexing (TDD), or a combination thereof.

NG-RAN 399 can be partitioned into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.4.0). If security protection for CP and UP data on TNL of NG-RAN interfaces is supported, NDS/IP (defined in 3GPP TS 33.401 v15.6.0) shall be applied.

The NG-RAN logical nodes shown in FIG. 3 (and described in 3GPP TS 38.401 v15.4.0 and 3GPP TR 38.801 v14.0.0) include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 3. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;
F1 supports the exchange of signaling information between respective endpoints, as well as data transmission to the respective endpoints;
from a logical standpoint, F1 is a point-to-point interface between the endpoints (even in the absence of a physical direct connection between the endpoints);
F1 supports control plane (CP) and user plane (UP) separation, such that a gNB-CU may be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized UP protocols (e.g., PDCP-U).

In addition to the RRC_IDLE and RRC_CONNECTED states discussed above, NR UEs also support an RRC_INACTIVE state with similar properties as the suspended condition in LTE Rel-13. Even so, the RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

Figure 4:
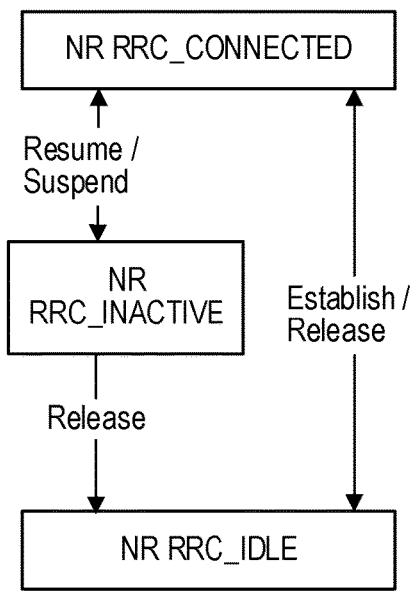
FIG. 4, illustrates NR RRC states and procedures by which a UE transitions between the NR RRC states.

FIG. 4 shows NR RRC states and procedures by which a UE transitions between the NR RRC states. The properties of the states shown in FIG. 4 are summarized as follows:

RRC_IDLE:
UE-specific discontinuous reception (DRX) operation may be configured by upper layers;
UE-controlled mobility based on network configuration (e.g., cell reselection);
The UE:

Monitors a Paging channel for CN paging using 5G-S-TMSI;

Performs neighbor cell measurements and cell (re-) selection; and

Acquires system information.

RRC_INACTIVE:

UE-specific DRX operation may be configured by upper layers or by RRC;

UE-controlled mobility based on network configuration;

The UE stores the AS context;

The UE:

Monitors a Paging channel for CN paging using 5G-S-TMSI, and for RAN paging using I-RNTI;

Performs neighbor cell measurements and cell (re-) selection;

Performs RAN-based notification area updates periodically and when moving outside the RAN-based notification area; and Acquires system information.

RRC_CONNECTED:

The UE stores the AS context.

Transfer of unicast data to/from UE via shared data channels (e.g., PDSCH and/or PUSCH).

At lower layers, the UE may be configured with a UE-specific DRX;

For UEs supporting CA, use of one or more SCells, aggregated with the SpCell, for increased bandwidth;

For UEs supporting DC, use of one SCG, aggregated with the MCG, for increased bandwidth;

Network-controlled mobility, i.e. handover within NR and to/from E-UTRAN.

The UE:

Monitors a Paging channel;

Monitors control channels associated with the shared data channel to determine if data is scheduled for it;

Provides channel quality and feedback information;

Performs neighbor cell measurements and measurement reporting; and

Acquires system information.

As shown in FIG. 4, the transitions between RRC_INACTIVE and RRC_CONNECTED states are realized by two new procedures: "Suspend" (also called RRC connection release with SuspendConfig) and "Resume." A gNB can suspend a connection and move a UE from RRC_CONNECTED to RRC_INACTIVE by sending the UE an RRCRelease message with suspend indication (or configuration). This can happen, for example, after the UE has been inactive for a certain period, causing a gNB internal inactivity timer to expire. Upon moving RRC_INACTIVE, both the UE and gNB store the UE's access stratum (AS) context and the associated identifier (referred to as I-RNTI).

Likewise, a UE can attempt to resume a connection toward a particular gNB (e.g., same or different cell from which the connection was suspended) by sending the gNB an RRCResumeRequest message including the I-RNTI, a security token (called resumeMAC-I) used to identify and verify the UE at RRC connection resume, and an indication of the resume cause (e.g., mobile originated data). The gNB serving the cell in which the UE attempts to resume is often referred to as "target gNB," while the gNB serving the cell in which the UE was suspended is often referred to as the "source gNB." To resume the connection, the target gNB identifies the source gNB (e.g., from a portion of the I-RNTI) and requests that gNB to send the UE's context. In this request, the target gNB provides, among other things, a target cell ID, a UE ID, and security token received from the UE. The NR resume procedure is similar in some ways to the corresponding resume procedure in LTE (e.g., E-UTRAN and EPC) and eLTE (e.g., E-UTRAN and 5GC).

As mentioned above, an RRC_CONNECTED UE can be configured by the network to perform measurements and, upon triggering measurement reports, the network may send a handover command to the UE. In LTE, this command is an RRConnection-Reconfiguration message with a mobilityControlInfo field. In NR, this command is an RRCReconfiguration message with a reconfigurationWithSync field.

These reconfigurations are prepared by the handover target mode upon a request from the source node, exchanged over X2 or S1 interface in LTE (see, e.g., FIG. 1) or NG interface in case of NR (see, e.g., FIG. 3). These reconfigurations typically take into account the existing RRC configuration between the UE and the source cell, which is provided in the inter-node request. In LTE, for example, this existing UE configuration is provided in the HandoverPreparationInformation of the request from the source node to the target node. In response, the target node provides reconfiguration parameters that contain all information the UE needs to access the target cell, e.g., random access configuration, a new C-RNTI assigned by the target cell, security parameters enabling the UE to calculate new security keys associated with the target cell, etc. The new security keys enable the UE to send a handover complete message on SRB1, which is encrypted and integrity protected, upon accessing the target cell.

Figure 5A:
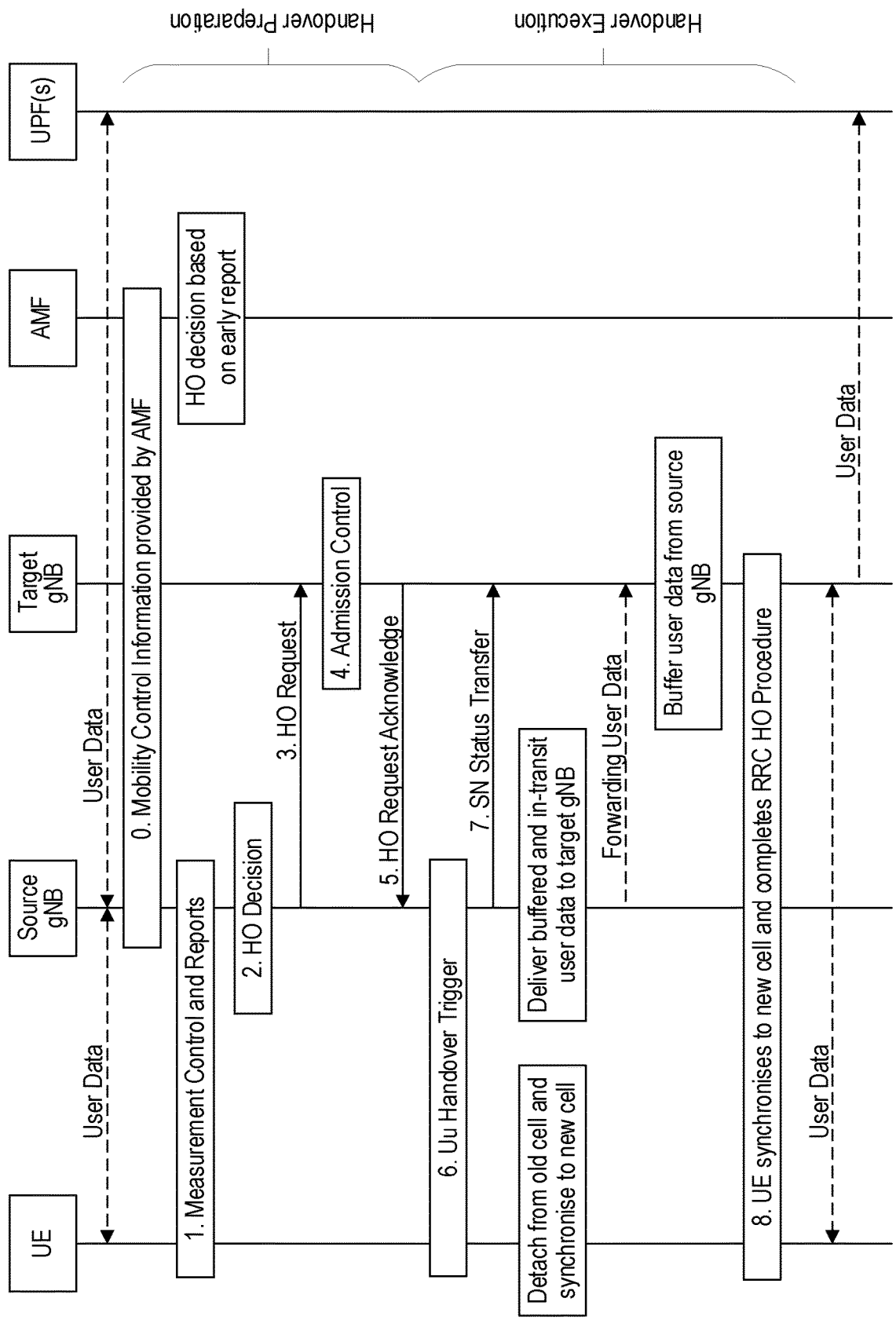
FIG. 5, which is divided in to FIGS. 5A and 5B, illustrates the signalling flow between a UE, a source node (e.g., source gNB), and a target node (e.g., target gNB) during a handover procedure in an NR network.
Figure 5B:
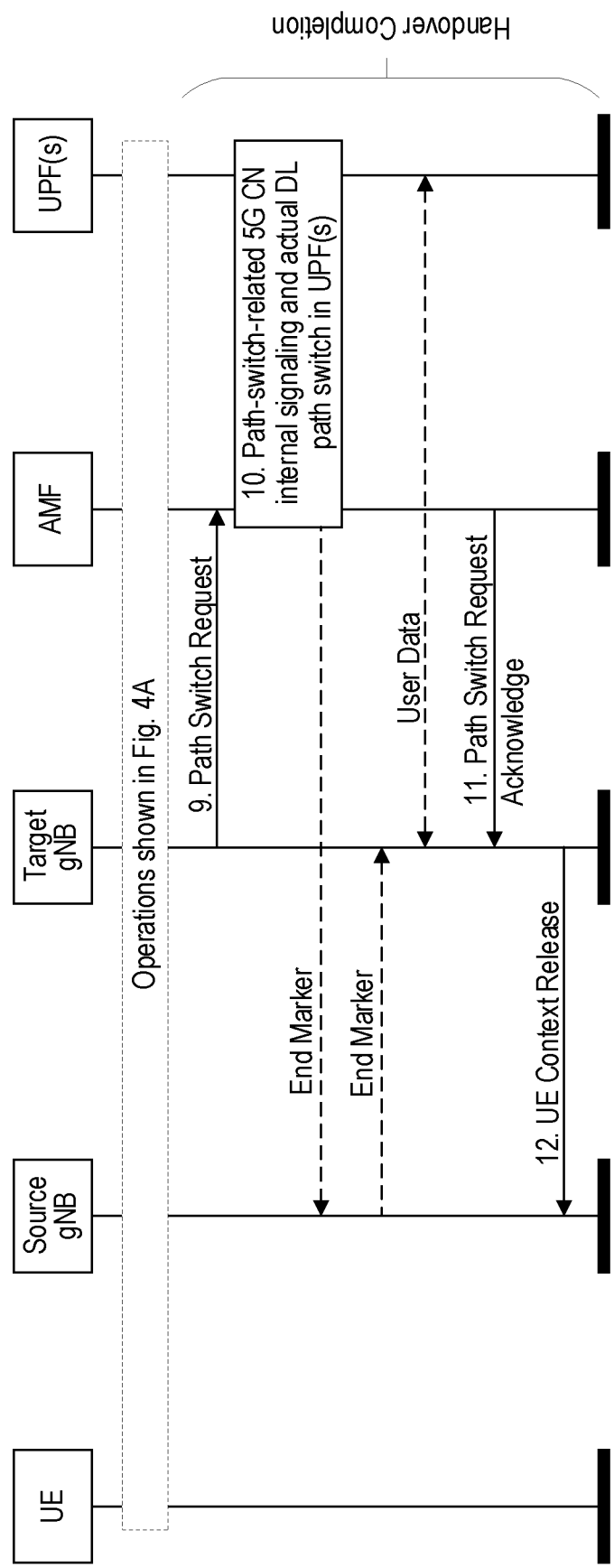

FIG. 5, which is divided in to FIGS. 5A and 5B, illustrates the signalling flow between a UE, a source node (e.g., source gNB), and a target node (e.g., target gNB) during a handover procedure in an NR network. FIG. 5 also illustrates the roles of 5GC functions including access management function (AMF) and user-plane function (UPF). Even so, the following discussion addresses various principles related to HO (or more generally, UE mobility while in RRC_CONNECTED mode) in both NR and LTE networks.

First, UE mobility in RRC_CONNECTED is network-based, since the network has the most recent and/or most accurate information regarding current situation such as load conditions, resources in different nodes, available frequencies, etc. The network can also take into account the situation of many UEs in the network, from a resource allocation perspective.

As illustrated in FIG. 5, there are three phases to the handover procedure: handover preparation, handover execution, and handover completion. Prior to the handover preparation, the UE may have been sending and/or receiving user data to a UPF in the 5GC via the source gNB. During the handover preparation phase, the network prepares a target cell before the UE accesses that cell. The AMF provides mobility control information to the source gNB (operation 0). In addition, the source node receives measurement reports from the UE (operation 1), makes a handover decision based on these reports (e.g., operation 2), and negotiates a handover of the UE with the target node (e.g., operations 3-5).

During handover execution, the source node provides the UE with various information to trigger handover to a target cell served by the target node (operation 6), and also provides the target node with the UE's current status in the source node (operation 7). For example, the source node (e.g., in operation 6) provides the UE with the RRC configuration to be used in the target cell, including SRB1 configuration (e.g., parameters from which to derive keys for encryption/integrity protection) to send the HO complete message (e.g., RRCConnectionReconfigurationComplete). The source node provides the UE with a target C-RNTI, so that the target node can identify the UE from random-access msg3 on MAC level for the HO complete message. This information is received from the target node during the handover preparation phase. Accordingly, unless a failure occurs, there is no need for the target node to perform UE context fetching.

Furthermore, to speed up the HO, the source node provides the UE with needed information on how to access the target (e.g. RACH configuration), so the UE does not have to acquire target node system information (SI, e.g., from broadcast) prior to the handover. Both full and delta reconfiguration are supported so that the HO command can be minimized. The UE may be provided with contention-free random-access (CFRA) resources; in that case, the target node can identify the UE from the RACH preamble (also referred to as msg1). More generally, the normal HO procedure can always be optimized with dedicated resources, such as CFRA resources.

Also during the handover execution phase, the UE detaches from the old cell (e.g., served by the source node) and synchronises to the new cell served by the target node (e.g., operation 8). Concurrent with these operations, the source node delivers buffered user data for the UE to the target node, which can subsequently communicate this user data to the UE after the UE completes the handover.

During the handover completion phase, the target node and the source node in the NG-RAN communicate with the 5GC (e.g., the AMF) to update the path information associated with the UE (e.g., operations 9 and 11). In addition, nodes or functions within the 5GC (e.g., AMF and UPF) can communicate to update the UE path based on the handover (e.g., operation 10). Finally, the target node can inform the source node that it can release the UE's context (e.g., operation 12).

As mentioned above, "delta signalling" is used to reduce the amount of RRC signalling between the network and the UE. As also mentioned above, delta signalling is typically implemented with protocol features such as "need codes," AddMod lists, and UE variables where received configurations are stored.

In NR, a measurement configuration may be provided to the UE in a RRCResume or a RRCReconfiguration message. For example, such measurement configuration can be provided as a delta with respect to one or more measurement configurations (e.g., a full measurement configuration) provided earlier to the UE. For example, FIG. 6A shows an ASN.1 data structure defining an exemplary RRCResume message that includes a full measurement configuration information element (measConfig IE) for a UE.

The measConfig IE in FIG. 6A is labelled "Need M" and specifies specifies measurements to be performed by the UE, and covers intra-frequency, inter-frequency and inter-RAT mobility as well as configuration of measurement gaps. The "Need M" code means that this field needs to be stored by the UE. In addition, the measConfig IE in FIG. 6A references a MeasConfig data structure, which can be defined by the exemplary ASN.1 data structure shown in FIG. 6B. Note that some of the fields in FIG. 6B are also labelled "Need M." Table 1 below provides further definition of certain fields shown in FIG. 6B.

TABLE 1

| Field name | Description |
| --- | --- |
| measGapConfig | Used to setup and release measurement gaps in NR. |
| measIdToAddModList | List of measurement identities to add and/or modify. |
| measIdToRemoveList | List of measurement identities to remove. |
| measObjectToAddModList | List of measurement objects to add and/or modify. |
| measObjectToRemoveList | List of measurement objects to remove. |
| reportConfigToAddModList | List of measurement reporting configurations to add and/or modify |
| reportConfigToRemoveList | List of measurement reporting configurations to remove. |
| s-MeasureConfig | Threshold for NR SpCell RSRP measurement controlling when the UE is required to perform measurements on non-serving cells. Choice of ssb-RSRP corresponds to cell RSRP based on SS/PBCH block and choice of csi-RSRP corresponds to cell RSRP of CSI-RS. |
| MeasGapSharingConfig | The IE MeasGapSharingConfig specifies the measurement gap sharing scheme |

Once the measConfig IE is provided to the UE in the RRCResume message, the UE stores the above-described based on their associated "Need M" codes. In particular, the UE stores the information received in measConfig in the UE variable VarMeasConfig that includes the accumulated configuration of measurements to be performed by the UE, including intra-frequency, inter-frequency, and inter-RAT mobility-related measurements. FIG. 6C shows an ASN.1 data structure defining an exemplary VarMeasConfig used by a UE in this manner.

Assume that the UE receives an RRCReconfiguration with a reconfigurationWithSync indicating that the UE shall perform a handover to a target cell. Upon receiving that message, the UE applies the contents of that message to its configuration. If the measConfig IE is present, the UE updates its stored configuration with any new values or sub-fields included in that IE. Due to the delta signalling, the network only includes the values or sub-fields that are new or have changed. If no configuration changes are needed, the network does not include the measConfig IE, and the UE continues using its currently stored measConfig. For the specific case of handover, if the target node realizes that the UE's stored measurement configuration is the desired configuration for the UE to use in the target cell, the target node simply does not signal anything. Or, if certain fields should be changed, the target node only includes those in the measConfig IE sent to the UE.

For example, assume that the UE has a stored a measConfig received in RRCResume, and now the UE receives a RRCReconfiguration with a MeasConfig IE containing a measConfig'. As shown in FIG. 6B, the fields s-Measure-Config, quantityConfig, measGapConfig, and measGapSharingConfig in this IE are labelled "Need M." This means that if any of these fields are missing in the received IE, the UE shall continue to use the corresponding stored parameter from measConfig.

For example, if in RRCResume the UE received quantityConfig, measGapConfig, s-MeasureConfig, and measGapSharingConfig, and in RRCReconfiguration the UE receives a measConfig' with a quantityConfig' only, the UE replaces quantityConfig by quantityConfig' and continues using the other stored values received in measConfig. As such, after this delta signalling, the UE's stored configuration will be quantityConfig', measGapConfig, s-MeasureConfig, and measGapSharingConfig.

For the MeasConfig fields with code "Need N," the list structure is used, but the principle is similar. "Need N" stands for "No action", indicating fields that are not stored and whose presence causes a one time action by the UE. Upon the absence of a "Need N" field, the UE performs no action. Such a list structure is important for configuring the UE with measurement objects to be measured (e.g., carrier frequency, cells, cell quality derivation parameters in NR, frequency specific thresholds, etc.), reporting configurations (e.g., event triggered measurement reporting configuration), measurement identifiers, etc. It is also used to remove these.

Despite the fact that such fields are labelled "Need N," their reception triggers the UE to store the information included. For example, if the network wants to add a measurement object to the UE when it sends the initial measConfig of the previous example, this triggers the UE to perform the following one-time procedure (assuming that the object does not exist frequency bands even spottier. Fortunately, operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties.

Despite the link budget gains provided by beamforming solutions, reliability of a system purely relying on beamforming and operating in higher frequencies might be challenging, since the coverage might be more sensitive to both time/frequency and space variations. Consequently, the SINR of such narrow links can drop much quicker than in the case of LTE. Even for LTE, it has been observed that the serving cell may not be able to convey the HO command timely. Lowering Time-To-Trigger (TTT) and the measurement hysteresis allowed can reduce the handover failure rate but can also increase ping-pong probability (e.g., of bouncing between cells). These effects can be even more pronounced when operating at higher frequency bands of NR.

Figure 7B:
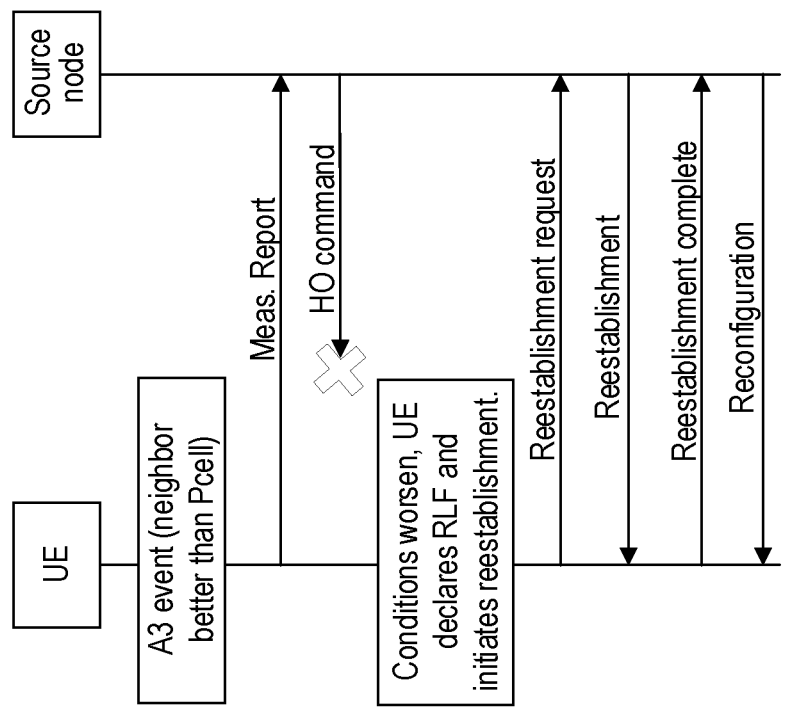
FIGS. 7A and 7B, illustrates two exemplary robustness problems that can occur during UE mobility operations, such as a handover.
Figure 7A:
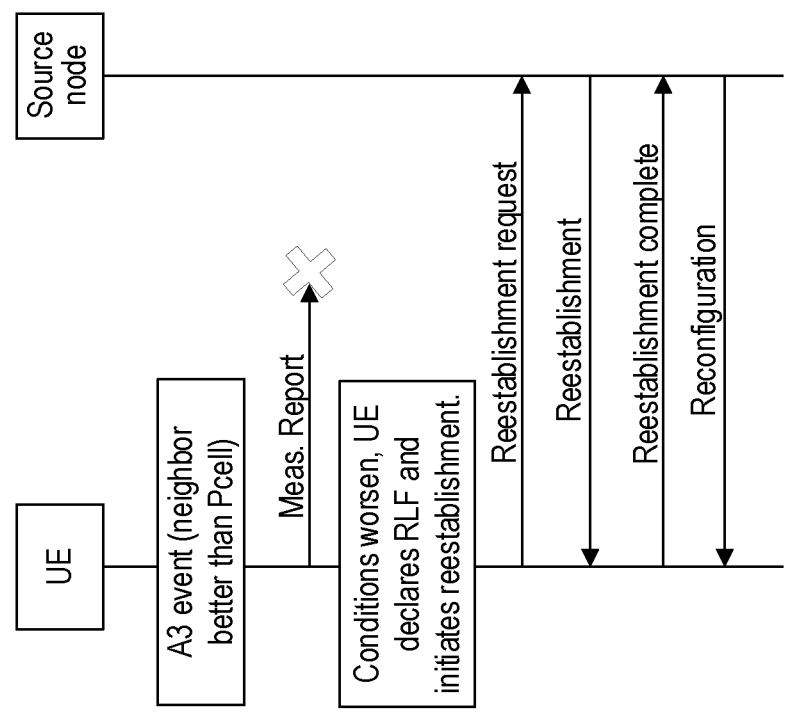

FIG. 7, which includes FIGS. 7A and 7B, illustrates various exemplary robustness problems that can occur during UE mobility operations, such as during a handover. In the scenario shown in FIG. 7A, based on neighbour-cell measurements, the UE triggers an "A3 event" where the neighbour cell is better than the UE's primary cell (PCell). In response, the UE attempts to send a measurement report about this condition to the source (e.g., serving) node. Due to the rapidly degrading uplink radio conditions, however, the source node does not receive the measurement report

```
1>if the received measConfig includes the measObjectToAddModList:
    2> The UE shall:
        1>for each measObjectId included in the received measObjectToAddModList:
            2>if an entry with the matching measObjectId exists in the measObjectList within
               the VarMeasConfig, for this entry:
            ...
            2>else:
                3>add a new entry for the received measObject to the measObjectList within
                   VarMeasConfig.
```

Since the UE stores this list information, delta signalling is performed by sending a pointer or identifier to a specific configuration known to be stored at the UE. If any of these lists are provided in a subsequent message with measConfig, the UE keeps what it has stored in the VarMeasConfig and continues performing measurements accordingly. If the network wants to explicitly add a measurement object, report configuration, and/or measurement identifier, it simply includes the field and adds a new one. That will be added in the list stored by the UE in VarMeasConfig. Similar if the network wants to remove or modify an existing measurement object or report configuration, which is referred by an identifier provided in the AddMod lists.

One of the main goals of NR is to provide more capacity for operators to serve ever-increasing traffic demands and variety of applications. Because of this, NR should be able to operate on high frequencies (over 6 GHz and up to 100 GHz), where more spectrum will be available. In comparison to the current frequency bands allocated to LTE, some of the new bands will have much more challenging propagation properties such as lower diffraction and higher outdoor/indoor penetration losses. As a consequence, signals have less ability to propagate around the corners and penetrate walls. In addition, atmospheric/rain attenuation and higher body losses make the coverage of NR signals in high from the UE. Conditions continue to degrade in the UE's source cell, ultimately prompting the UE to declare radio link failure (RLF) and attempt to reestablish a connection with the source node (which may or may not be successful). In FIG. 7B, the source node correctly receives the UE's measurement report but due to degrading downlink radio conditions, the UE does not receive the HO command from the source node. Ultimately, the same result occurs in both cases shown in FIG. 7.

As such, there is a need to improve mobility robustness in NR systems, and work items for mobility enhancements in LTE and NR have started in 3GPP Rel-16. The main objectives of the work items are to improve the robustness at handover and to decrease the interruption time at handover. In LTE and NR, different solutions to increase mobility robustness have been discussed in the past. One solution is based on Dual Connectivity (DC) introduced in LTE Rel-12. In DC, the UE is connected to two network nodes simultaneously. This improves mobility robustness by serving control plane traffic (e.g. used for measurement reporting and handover command) by a robust macro layer at lower frequency and providing capacity boost with higher frequencies. This feature is often referred to as "UP/CP split." Alternately, DC can be configured such that control plane signaling is exchanged via both connected nodes. This is referred to as "RRC diversity" and can increase robustness due to the diversity in temporal and spatial domains.

As briefly mentioned above, another solution is called "conditional handover" (or "CHO" for short) or "early handover command." In order to avoid the dependence on the serving radio link conditions at the time when the UE should execute the handover, the RRC signaling for the handover can be provided to the UE earlier, while conditions on the radio link are better. To achieve this, the HO command can be associated with a condition (e.g., radio conditions similar to the ones associated to an A3 event).

For example, an exemplary execution condition could be that the quality of the target cell or beam becomes X dB stronger than the serving cell. A preceding measurement reporting event could use a threshold Y that is selected to be lower than the one in the handover execution condition. This allows the serving cell to prepare the handover upon reception of an early measurement report and to provide the RRCConnectionReconfiguration with mobilityControlInfo (for LTE), or a RRCReconfiguration with either a reconfigurationWithSync or a CellGroupConfig (for NR) at a time when the radio link between the source cell and the UE is still relatively stable. The execution of the handover is done at a later point in time (and threshold) that is optimal and/or preferred for handover execution.

Figure 8:
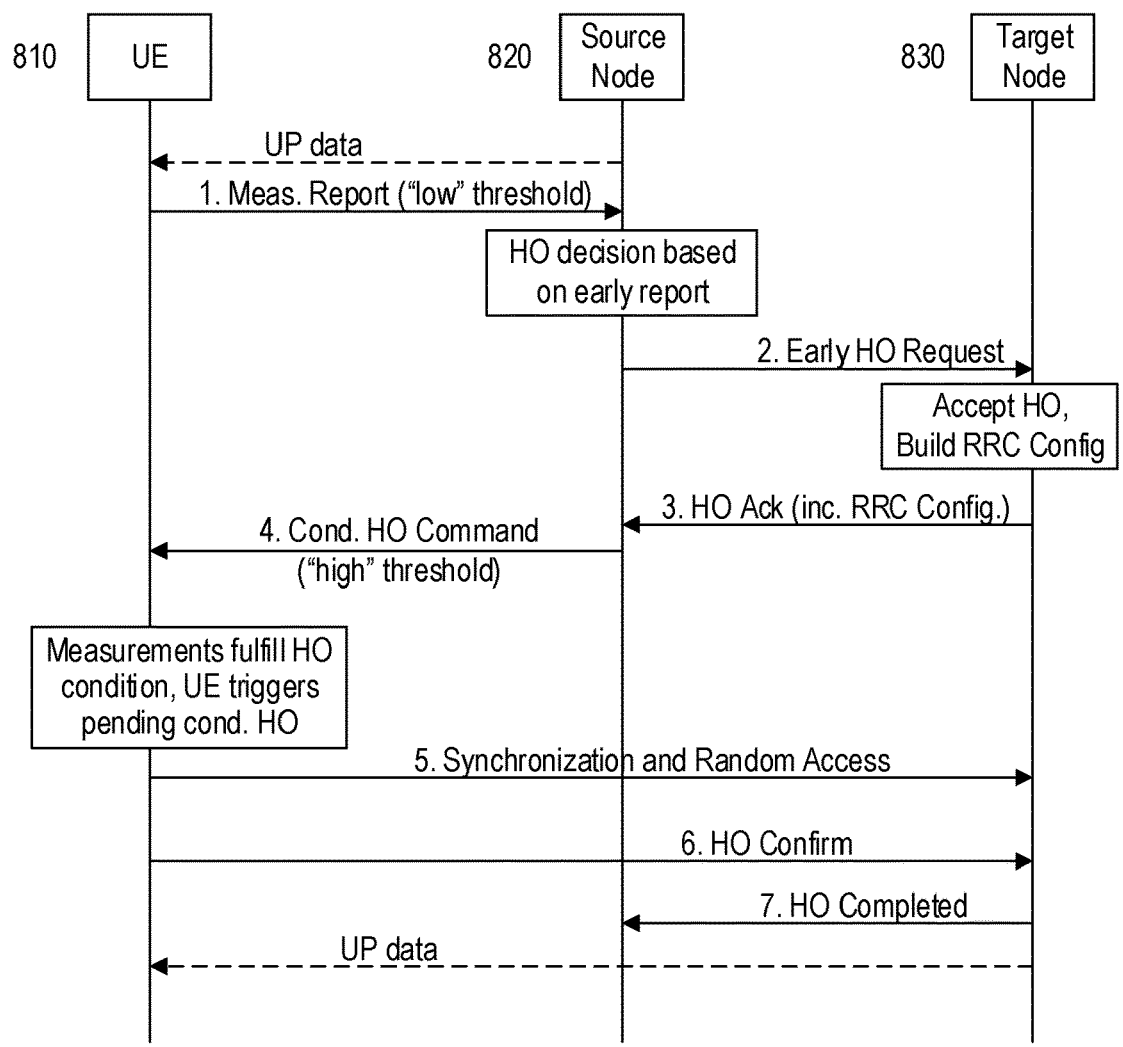
FIG. 8 shows a signalling flow between a UE, a source node, and a target node for CHO, according to exemplary embodiments of the present disclosure.

FIG. 8 illustrates an exemplary signal flow between a user equipment (UE) 810, a source node 820, and a target node 830 for a conditional handover (HO), according to exemplary embodiments of the present disclosure. For example, the source and target nodes can be gNBs and/or components of gNBs, such as CUs and/or DUs.

This procedure involves two different measurement thresholds: a low threshold and a high threshold. The two thresholds can be expressed as different levels of a particular metric, e.g., signal strength, signal quality, etc. For example, the high threshold could be that the quality of the mobility RS (MRS) of the target cell or beam becomes X dB stronger than the MRS of the UE's serving cell (e.g., provided by the source node), with the low threshold being less than the high threshold (i.e., target exceeds source by lower amount). As used in this context, MRS denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

The UE can be provided with a measurement configuration including the low threshold (not shown in the figure). Upon performing measurements that meet the low threshold, the UE can send a measurement report to the serving node (operation 1). While performing the measurements and evaluating the low threshold, the UE continues operating in its current RRC configuration. In operation 2, based on this report, the source node can decide to request an early handover of the UE to the target node (e.g., to a cell indicated in the measurement report). For example, this early handover request can include a HandoverPreparationInformation IE such as described above.

The target node performs admission control for the UE and responds with the handover acknowledgement (operation 3) that includes RRC configuration, similar to the basic handover shown in FIG. 5. In operation 4, the source node then sends the UE a "Conditional HO Command", which can include the high threshold. Upon receiving this command, the UE continues to perform measurements and whenever the high threshold condition is met, it can move to the target node and performs the handover (e.g., operations 5-7). Even so, the UE can remain in the serving cell (i.e., provide by the source node) for an extended amount of time in case the high threshold condition is not fulfilled.

This allows the serving cell to prepare the handover upon reception of an early measurement report and to provide the Conditional HO Command (e.g., RRCConnectionReconfiguration with mobilityControlInfo for LTE, or RRCReconfiguration with either a reconfigurationWithSync or a CellGroupConfig for NR) at a time when the radio link between the source cell and the UE is still relatively stable. The UE executes the handover at a later point in time (and threshold) that is optimal and/or preferred.

Although FIG. 8 shows an exemplary conditional handover involving a single serving cell and a single target cell, other scenarios may involve many cells or beams that the UE has reported as possible candidates based on its radio resource management (RRM) measurements. The network should have the freedom to issue conditional handover commands for any of those candidates. The Conditional HO Command for each of those candidates may differ, in terms of the HO execution condition (e.g., reference signal (RS) to measure, threshold to exceed, etc.) and/or in terms of the RA preamble to be sent when a condition is met.

Each RRCConnectionReconfiguration/RRCReconfiguration message is typically a "delta" with respect to the UE's current configuration. LTE UEs apply RRCConnectionReconfiguration messages in the order in which they receive them. When the UE receives a "conditional HO command" it should interpret the corresponding RRC signaling as delta to its current configuration (unless it is a full configuration message). It may in principle determine the target configuration immediately upon reception of the command, but it shall apply/execute it only if the associated condition is fulfilled. While the UE evaluates the condition, it should continue operating according to its current RRC configuration without applying the conditional HO command. When the UE determines that the condition is fulfilled, it disconnects from the serving cell, applies the conditional HO command, and connects to the target cell.

Put differently, a UE is configured with at least one measurement-related condition associated with a mobility command or operation (e.g., an RRCReconfiguration or RRCConnectionReconfiguration message), where the UE shall apply the mobility command and perform specified actions upon the triggering of the condition. However, there are several problems with this configuration process.

First, there can be inconsistencies between measurements the UE is already configured to perform (e.g., upon receiving earlier message containing measConfig) and the measurements associated with the condition(s) of the conditional mobility command. In other words, it is uncertain whether the measurements required to be performed for monitoring the associated conditions are properly configured. For example, certain parameters can be missing.

Second, the conditional mobility command may need to include a large amount of configuration information for the UE, which may need to be transmitted in poor radio conditions. The combination of large messages and poor radio conditions increases the likelihood of the command being delayed, resulting in RLF for the UE.

Figure 9A:
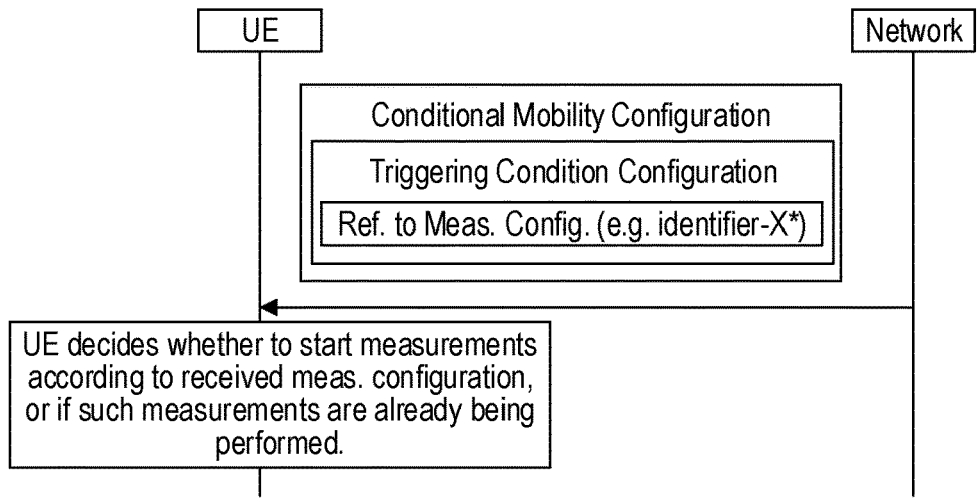
FIGS. 9A-9C, shows three different techniques for configuring a UE with a conditional mobility (e.g., CHO) triggering condition.
Figure 9B:
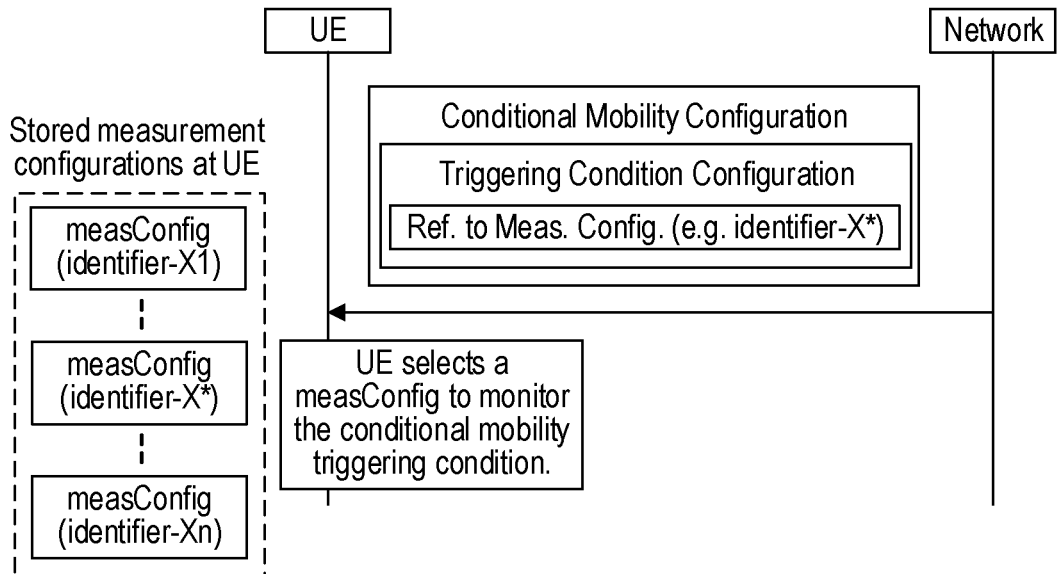
Figure 9C:
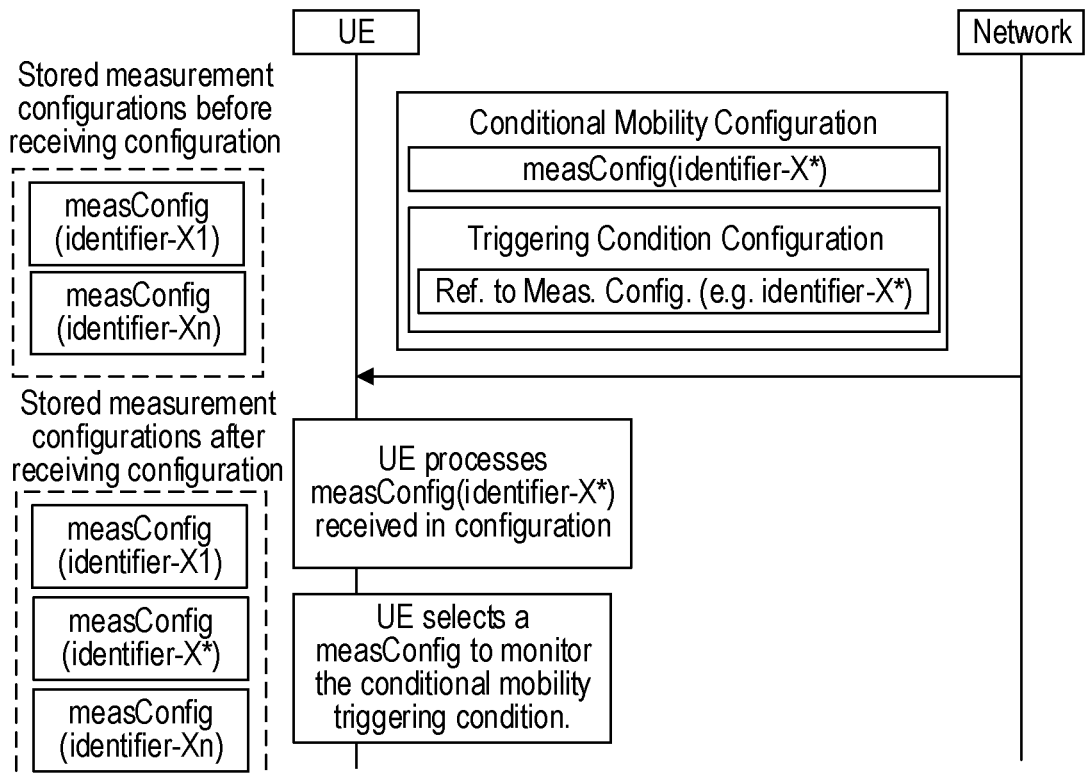

FIG. 9, which includes FIGS. 9A-9C, shows three different techniques for configuring a UE with a conditional mobility (e.g., CHO) triggering condition, that at least partially address some of these issues. FIG. 9A shows the signaling from for a technique in which the UE receives, from the network (e.g., gNB), a conditional mobility configuration (e.g. RRCCondilionalReconfiguration) that includes at least one triggering condition for a mobility procedure (e.g., handover). The triggering condition can include at least one reference to, or identifier of, a measurement configuration (e.g., labelled "identifier-X*" in FIG. 9A). After receiving the triggering condition with the included identifier, the UE determines whether measurements associated with the identifier need to be initiated, or if they are already being performed by the UE.

FIG. 9B shows a variation of the technique shown in FIG. 9A. In this variation, the provided identifier-X* references a measurement configuration already stored at the UE, possibly received in a message processed before the message including the conditional mobility configuration. As such, the conditional mobility configuration message does not need to include a detailed measurement configuration, only the identifier to the early-received configuration. After receiving the identifier, the UE can match it with the stored configuration and initiate measurements based on that matching configuration.

FIG. 9C shows another variation of the technique shown in FIG. 9A. In this variation, the provided identifier references a measurement configuration that is also provided with the conditional mobility configuration. In other words, the message may contain a measurement configuration (labelled measConfig) and a reference to it (labelled identifier-X*). In this variation, the measurement configuration can be provided explicitly for the purpose of conditional mobility (e.g., conditional resume/reestablishment/handover). After receiving the message, the UE can store the provided configuration and also initiate measurements based upon it.

Although the techniques illustrated by FIG. 9 address measurements for detecting the pre-mobility triggering condition, they do not address any measurements that must occur at execution of the mobility procedure itself (e.g., at handover) after the triggering condition has been detected. For example, for each target cell candidate for handover after the triggering condition is met, the CHO configuration can include the following information:

Triggering condition configuration (including a measurement configuration); and
RRCReconfiguration with reconfigurationWithSync (or parameters/fields/IEs equivalent to the ones defined for these messages, used for handover/reconfiguration).

Figure 10:
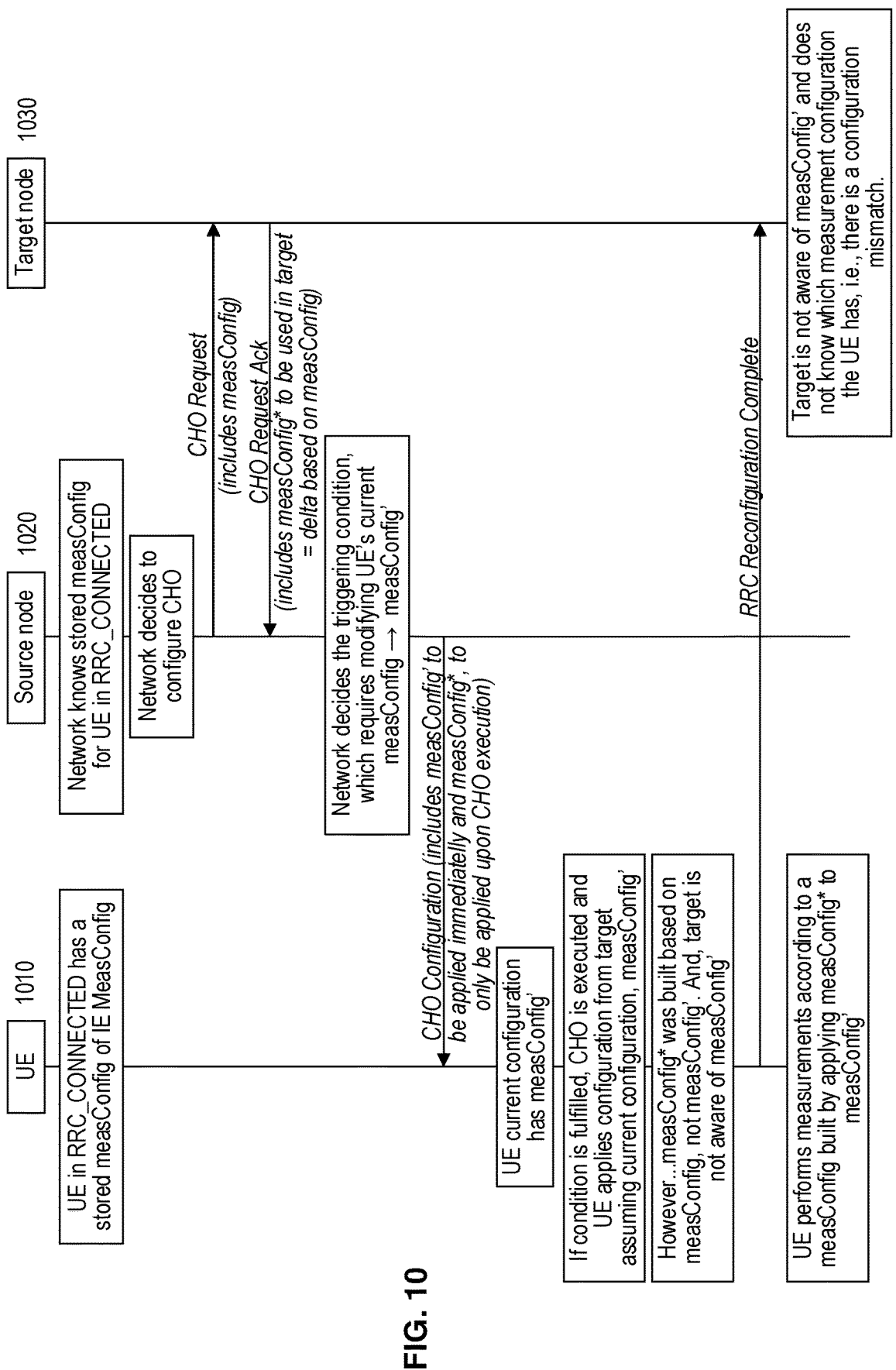
FIG. 10 shows a signaling flow of an exemplary technique that utilizes delta signaling to provide a UE with measurement configurations to be used during and after a conditional mobility (e.g., CHO) operation.

FIG. 10 shows a signaling flow of an exemplary conditional mobility (e.g., CHO) technique involving three different UE measurement configurations—measConfig, measConfig', and measConfig*. Each RRCReconfiguration may contain its own measurement configuration (e.g., a measConfig*), which can be indicated by delta signaling in relation to the current UE measurement configuration, e.g., measConfig used by the UE 1010 (subsequently referred to as "UE") before the conditional mobility operation was configured. In other words, the measConfig* generated by each target node in the RRCReconfiguration is what that target node expects the UE to use in the target cell after execution of the mobility operation.

As shown in FIG. 10, initially the UE is operating in RRC_CONNECTED state with a stored measurement configuration, measConfig. The source node 1020 (e.g., a gNB, subsequently referred to as "source node") serving the UE's current source cell is also aware of measConfig. Subsequently, the source node decides to configure a CHO for the UE to a particular target cell served by a target node 1030 (e.g., a gNB, subsequently referred to as "target node"). For example, this decision can be based on measurement reports from the UE. Similar to the arrangement shown in FIG. 8, the source node and target node exchange messages, with the target node providing measConfig* to be used by the UE in the target cell after CHO execution.

On the other hand, as discussed above, the source node may need to reconfigure the current UE measurement configuration measConfig for detection of the triggering condition prior to the mobility operation. This can also be done by delta signalling the measConfig', which can be different than measConfig*. For example, measConfig' could include a new event, a new threshold value, a new carrier, etc. that is different from both measConfig and measConfig*.

Once configured in this manner, the UE starts monitoring CHO triggering conditions using measConfig'. If the CHO condition is fulfilled, the UE executes CHO (which, at this point, is substantially equivalent to an ordinary handover) using the measConfig* prepared by the target cell where the UE is executing the procedure. In the case of delta signaling, since the UE most recently used measConfig' to detect the CHO triggering condition, the UE would apply the delta-signalled measConfig* against measConfig'. However, the target node previously determined measConfig* based on the UE's original measConfig prior to receiving the CHO command. In fact, the target node is unaware of the measConfig' when preparing measConfig*.

That creates a state mismatch where the UE and the network assume a different configuration for determining which types of measurements the UE shall perform in the target cell. That may lead to various problems such as the UE performing unnecessary measurements (which consume UE battery), not performing certain measurements decided by a particular target where the CHO was executed, reporting measurements using some measurement IDs unknown to the target node, etc.

Exemplary embodiments of the present disclosure address these and other problems, challenges, and/or issues by providing specific enhancements and/or improvements to mobility robustness in wireless networks. In general, embodiments include techniques and/or mechanisms that configure a UE with various measurement configurations in a manner that avoids confusion about which stored measurement configuration a UE should use after execution of a conditional mobility operation (e.g., CHO). Using these embodiments, both the UE and the target node for the mobility operation have a consistent understanding of which measurements that the UE will perform and/or report after execution of the mobility operation towards the target node (e.g., to a target cell served by the target node).

According to various embodiments, a UE can correctly manage measurement configurations relating to CHO triggering and CHO execution. In various embodiments, the UE can distinguish between the following three types of measurement configurations:

First measurement configuration used in the source cell, e.g., prior to a CHO command;
Second measurement configuration also used in source cell, but related to the monitoring of CHO triggering conditions; and
Third measurement configuration prepared for each CHO target candidate, and to be applied only upon CHO execution to that chosen candidate.

Upon CHO execution, the UE deletes the second measurement configuration and applies the third. In the case of a full third configuration (e.g., not delta-signalled), the UE can also delete the first configuration. In the case of a delta-signalled third configuration, the UE applies the third configuration to the second configuration. In some embodiments, the UE always has a single measurement configuration and the network ensures that the UE is configured with the correct measurements at any time.

In the following discussion of exemplary embodiments, the terms "handover" and "reconfiguration with sync" are used synonymously. As such, a conditional handover may also be called a conditional reconfiguration with sync. In NR terminology, a handover command is typically a RRCReconfiguration message with a reconfigurationWithSync field containing configuration necessary to execute the handover. In LTE terminology, a handover command is typically a RRCConnectionReconfiguration message with a mobilityControlInfo field containing configuration necessary to execute the handover.

The UE and network actions are primarily described herein using NR terminology, e.g., configuration of CHO received in NR for NR cells, with CHO executed in NR. However, exemplary embodiments are also applicable to non-NR scenarios, such as:

UE is configured with a conditional HO in NR (for candidate NR and LTE cells), then the condition is triggered for an NR cell and UE executes the HO in NR;

UE is configured with a conditional HO in LTE (for candidate NR and LTE cells), then the condition is triggered for an LTE cell and UE executes the HO in LTE;

UE is configured with a conditional HO in NR (for candidate NR and LTE cells), then the condition is triggered for an LTE cell and UE executes the HO in LTE;

UE is configured with a conditional HO in LTE (for candidate NR and LTE cells), then the condition is triggered for an NR cell and UE executes the HO in NR;

More generally, UE is configured with a condition HO in RAT-1 for cells in RAT-1 or RAT-2, then the condition is triggered, and UE executes the HO in RAT-2.

In general, exemplary embodiments are described in terms of conditional handover, but this is intended to be exemplary rather than limiting. Embodiments are also applicable for handovers triggered by the reception of an RRCReconfiguration message with a reconfigurationWithSync without any condition associated (or RRCConnectionReconfiguration with a mobilityControlInfo). In other words, while the UE is monitoring CHO conditions and it has received the second measurement configuration, the UE may receive an RRCReconfiguration with a reconfigurationWithSync indicating that the UE shall stop monitoring CHO conditions and perform a handover to the indicated target cell. Then, upon the execution of a handover to the indicated target cell, the UE may have stored the second measurement configuration. Hence, the actions described in the invention e.g. deleting/releasing this second measurement configuration, are still applicable.

Exemplary embodiments are also applicable to stored configurations during recovery, e.g., due to radio link or handover failure. In such case, the invention also covers the case where the UE deletes/releases the second measurement configuration. Exemplary embodiments are also applicable in case of suspend or release, in which the UE goes to RRC_INACTIVE or RRC_IDLE, respectively. In that case, the second measurement configuration, associated to CHO, is also deleted/released.

In general, the term "conditional handover" (or CHO) is used in the context of the described embodiments to refer to conditional mobility generally, including conditional resume, conditional reconfiguration with sync, conditional reconfiguration, beam switching/recovery, as well as conditional handover. As such, CHO should be interpreted as any procedure that is configured by network that includes a condition (e.g., associated with a measurement event) and mobility-related operation or procedure performed upon the triggering of that condition.

For example, the resume procedure discussed above in relation to FIG. 4 can be adapted into a conditional mobility solution called "conditional resume," which has properties similar to conditional HO shown in FIG. 8. More specifically, the UE can be provided with a low threshold "Y" to trigger measurement reporting while in RRC_INACTIVE state, and in response to reported measurements, a serving node can provide the UE with a "conditional resume" command that includes a high threshold "X" for triggering a resume towards a target cell provided by a target node. Unlike conditional HO, conditional resume relies on context fetching by the target node. Even so, embodiments of the measurement configuration techniques for conditional HO discussed herein are equally applicable to, and can provide similar advantages for, conditional resume operations.

In general, the following discussion uses the term "conditional resume" to refer to a condition associated with the triggering of either of the following:

a resume-like procedure (e.g., where the UE transmits an RRCResumeRequest like message containing an UE AS Context identifier allocated by the source node, like an I-RNTI, or a source C-NRTI+source physical cell identifier and a security token like a short MAC-I/resume MAC-I); or a reestablishment procedure (e.g. a radio link reestablishment procedure, where the UE transmits an RRCReestablishmentRequest like message containing an UE AS Context identifier allocated by source, like an I-RNTI, or a source C-NRTI+source physical cell identifier and a security token like a short MAC-I/resume MAC-I).

Exemplary embodiments are also applicable to conditional mobility configurations associated with a single cell or multiple cells. In the case of single cell, a single measurement configuration reference can be provided and linked/associated with a mobility procedure, such that the UE monitors a specific condition and when that is fulfilled the UE executes a specific procedure towards a specific node, e.g., specific target cell. In the case of multiple cells, a single measurement configuration reference may be provided and linked to the monitoring of multiple cells within the same measurement object/frequency/etc. Alternatively, multiple measurement configuration references can be provided that refer or link to different cells.

As an example, for the cells to be monitored for conditional handover, the UE may be configured with an RRCReconfiguration with reconfigurationWithSync (for NR) or RRCConnectionReconfiguration with mobilityControlInfo (for LTE), e.g., associated to a cell to be accessed when the condition is triggered.

As another example, for the cells to be monitored for conditional resume, the UE may be configured with at least one I-RNTI (for NR) or Resume ID (for LTE) (or another UE identifier) to be included in the RRCResumeRequest (for NR) or RRCConnectionResumeRequest (for LTE) (or similar message). Alternatively, this could be a source C-RNTI+PCI, like in a reestablishment request. For NR, the source node may provide a short or long I-RNTI depending how each potential target accepts long or short I-RNTI, depending on coverage. The source may provide both (short and long) I-RNTI and conditions per cell so that depending on which cell triggers the condition the UE includes the RRCResumeRequest-like message the short or the long I-RNTI.

The UE may also be configured with an RRCReconfiguration with reconfigurationWithSync (for NR) or RRCConnectionReconfiguration with mobilityControlInfo (for LTE) containing some information of the target cells but not a full configuration, as well as UE identifier, e.g., I-RNTI or Resume ID. The target cell information may, comprise information normally transmitted in system information, e.g., RACH information for faster access in the target cell. This information can also be included in a part of the reconfiguration message other than reconfigurationWithSync or mobilityControlInfo. Exemplary embodiments can also include monitoring of the conditional mobility triggering condition upon the reception of the configuration and, upon the triggering of the condition for a specific cell-X, selecting between conditional handover or conditional resume towards cell-X based on a second condition.

The following discussion of exemplary embodiments refers to actions upon the execution of a CHO or (non-conditional) HO. For example, the 3GPP specifications may define a set of operations that are the same for both CHO and HO. The distinguishing feature may be that the CHO is a HO triggered by the fulfillment of a condition and non-conditional HO is triggered by the reception of an RRCReconfiguration with a reconfigurationWithSync. Hence, embodiments are also applicable in the case a new procedure called CHO is created or in the case a legacy non-conditional HO procedure is triggered by the fulfillment of a condition.

Figure 11:
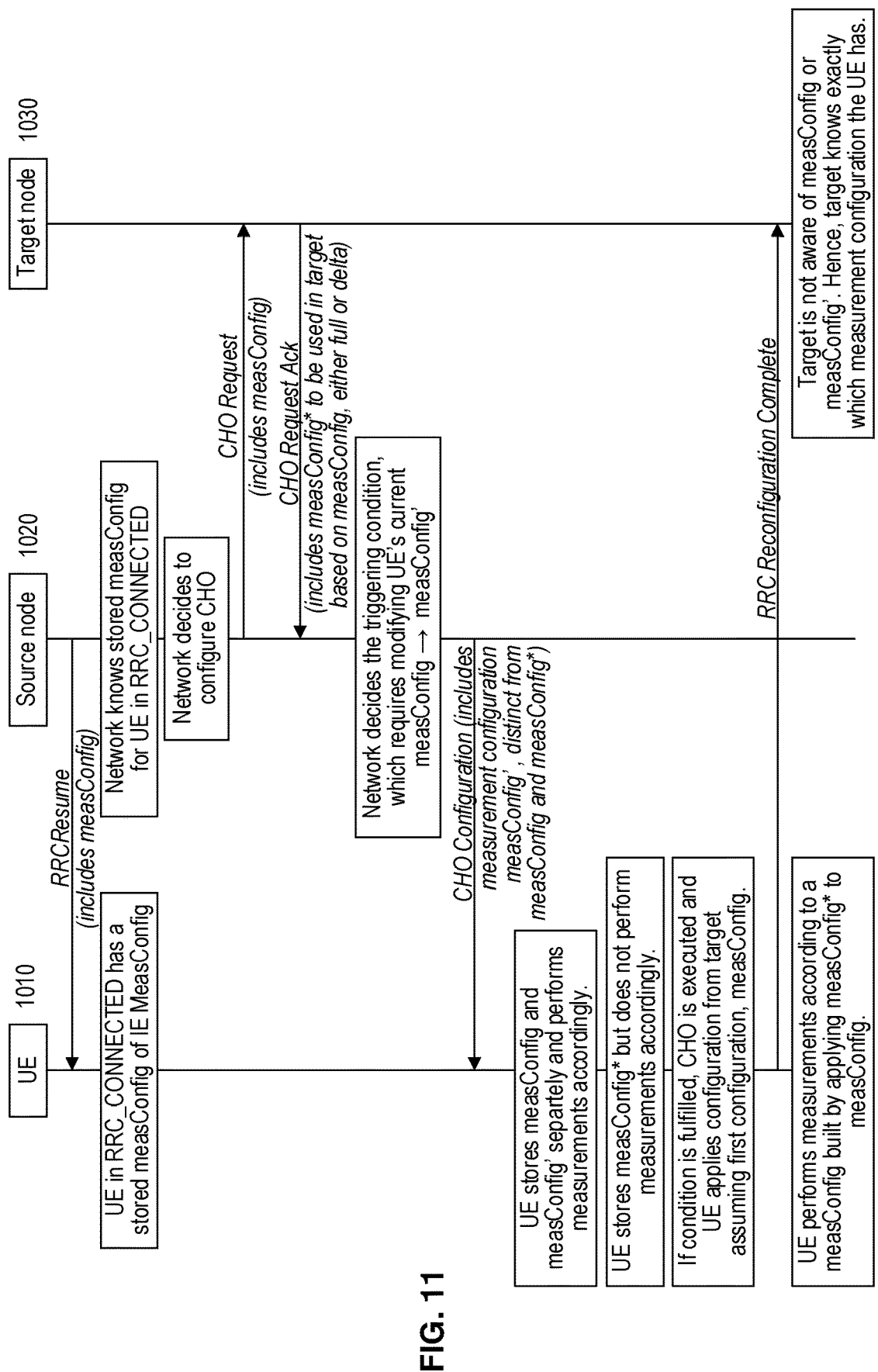
FIG. 11 shows a signaling flow of an improved technique for providing a UE with measurement configurations to be used during monitoring and execution phases of a conditional mobility (e.g., CHO) operation, according to various exemplary embodiments of the present disclosure.

FIG. 11 shows a signaling flow of an improved technique for providing a UE with measurement configurations to be used during monitoring and execution phases of a conditional mobility (e.g., CHO) operation, according to various exemplary embodiments of the present disclosure. Although the exemplary technique is illustrated in FIG. 11 by specific operations in a particular order, the operations shown can be performed in different orders than shown and can be combined and/or divided into operations having different functionality than shown. Furthermore, the exemplary technique shown in FIG. 11 can be complementary to other exemplary techniques, methods, and/or procedures disclosed herein, such that they can be used cooperatively to provide benefits, advantages, and/or solutions to various problems, including those described herein.

FIG. 11 is similar in many ways to the signaling flow shown in FIG. 10 and described above. As such, the same reference numbers are used and only the primary differences will be described below. Initially, the UE is configured with measConfig (e.g., via a RRCResume from the source node), which it can store (e.g., in VarMeasConfig) and use to perform various measurements. The UE can report to the source node the measurements made based on measConfig.

Subsequently, the source node determines that a conditional mobility operation (e.g., CHO) is needed for the UE. The source node sends, to each of one or more target node candidates, a request to accept the conditional mobility operation related to the UE. The request can include the UE's current measConfig. A single target node candidate is shown in FIG. 11 for purposes of conciseness and clarity. The target node responds with a confirmation or acknowledgement of the requested operation for the UE. The response can include the measConfig* that the target node has determined to be needed during execution of the mobility operation, i.e., after the UE has detected the condition triggering the mobility operation. The configuration measConfig* can be a full configuration or a delta configuration with respect to measConfig. For example, a delta measConfig* can be prepared based on the various Need codes and AddMod list rules and/or procedures discussed above.

The source node then determines the measConfig' needed so that the UE can detect and/or monitor the condition triggering the mobility operation. For example, a delta measConfig' can be prepared based on the various Need codes and AddMod list rules and/or procedures discussed above. The source node can also store measConfig'. In the embodiment shown in FIG. 11, the source node determines measConfig' after receiving measConfig* from the target node. In other embodiments, the source node can determine measConfig' (e.g., as a delta to measConfig) before sending the request to the target node. In such case, the request to the target node can also include measConfig', and the target node can determine measConfig* as a delta to measConfig' and measConfig.

Subsequently, the source node sends the UE a conditional mobility command that includes a first indication of the mobility operation to be performed, a second indication of the triggering condition, the measConfig' related to detecting the triggering condition, and the measConfig* related to execution of the mobility operation with the target node. Upon receiving this command, the UE stores measConfig' separately from measConfig that was previously received. In other words, the UE maintains measConfig rather than simply updating it with the delta in measConfig' as conventionally performed. For example, measConfig' can be stored in a different VarMeasConfig' or VarMeasConfigCHO. Alternately, measConfig' can be stored in the same VarMeasConfig used but in different fields that can be distinguished as being associated with conditional mobility (e.g., CHO). The UE also uses measConfig' to begin performing measurements for detecting the indicated triggering condition.

It may be the case that measConfig' and measConfig overlap. For example, both measConfig' and measConfig can indicate that the UE shall perform measurements on a given carrier, e.g., f0. In some embodiments, measConfig' can point to measConfig, i.e., it does not need to contain a completely separated configuration. Also, since measConfig is already stored, there is no need to store it twice, except if there is any difference in the configuration (e.g., same carrier but different cell quality derivation parameters, etc.). In some embodiments, measConfig' be flagged with an indication whether or not it shall be released upon CHO execution. That may be indicated for the whole configuration or parts of it. For example, each field in the configuration can have a flag indicating whether or not it should be released upon CHO execution.

The UE also stores received measConfig* but does not utilize it during the triggering detection, where measConfig' is utilized instead. Note that measConfig* may include measurement configurations for one or more candidate target cells served by one or more target nodes (e.g., neighbor cells served by one or more other network nodes). The measurement configurations for the respective target cells may differ in various ways. Since the UE does not know (prior to triggering detection) the target cell in which it will execute the conditional mobility operation, it must store each of these configurations.

In some embodiments, measConfig* may be identified by the fact that it is provided in a different field/parameter/IE/ etc., or by the fact that it is conveyed in a different message compared to the message providing measConfig. For example, measConfig* may be provided in a RRCReconfiguration-like message prepared by a neighbour cell that is a target candidate.

The UE also stores measConfig* separately from measConfig that was previously received. In other words, the UE maintains measConfig rather than simply updating it with the delta in measConfig* as conventionally performed. For example, measConfig* can be stored in a different VarMeasConfig* or VarMeasConfigCHO. Alternately, measConfig* can be stored in the same VarMeasConfig used but having different fields so that it can be distinguished as being associated with conditional mobility (e.g., CHO).

Once the UE detects the triggering condition, it executes the mobility operation indicated by the conditional mobility command. When executing the mobility operation, the UE stops performing measurements in the source cell using measConfig', and updates stored VarMeasConfig with measConfig* (either as a delta to measConfig/measConfig' or as a full configuration). In some embodiments, the UE deletes and/or releases the stored measConfig'. In other embodiments, where measConfig* is computed by the target node as a delta to measConfig' and measConfig, the UE retains measConfig' since it constitutes part of the new measurement configuration. The UE also accesses the target cell (including, e.g., RRCReconfiguration-Complete message) and starts performing and reporting measurements in the target cell based on measConfig*. Since the target node (i.e., serving the target cell) provided measConfig*, it is fully aware of the measurements being reported by the UE during execution of the mobility operation, such that a mismatch is avoided.

In some embodiments, the target node can send a message (e.g., UE Context Release) to the source node indicating that the conditional mobility operation has been executed. In response to this indication, the source node can delete and/or release any stored measurement configurations associated with the UE in the source cell, e.g., measConfig and measConfig'.

Figure 12:
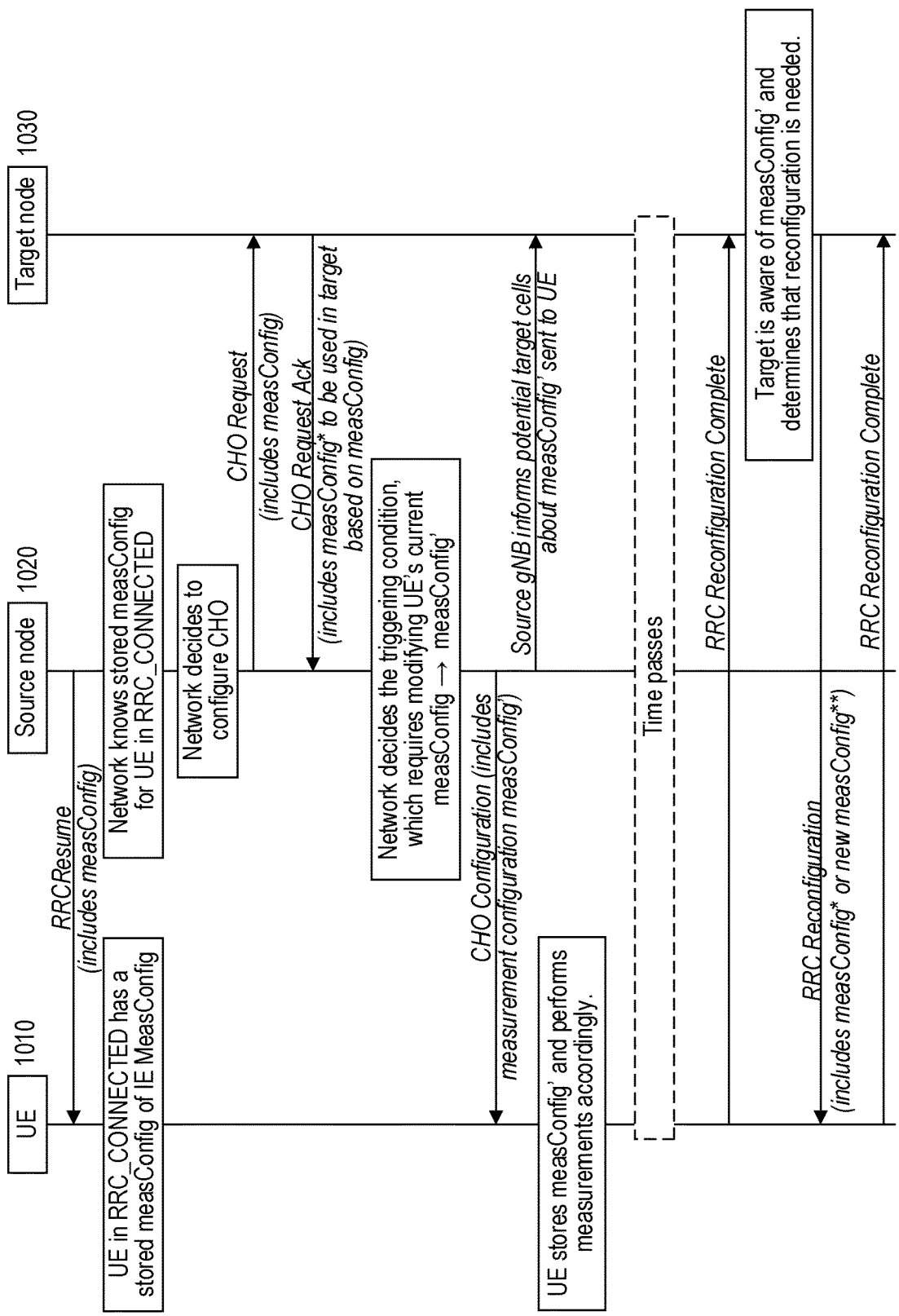
FIG. 12 shows a signaling flow of another improved technique for providing a UE with measurement configurations to be used during monitoring and execution phases of a conditional mobility (e.g., CHO) operation, according to various exemplary embodiments of the present disclosure.

FIG. 12 shows a signaling flow of another improved technique for providing a UE with measurement configurations to be used during monitoring and execution phases of a conditional mobility (e.g., CHO) operation, according to various exemplary embodiments of the present disclosure. Although the exemplary technique is illustrated in FIG. 12 by specific operations in a particular order, the operations shown can be performed in different orders than shown and can be combined and/or divided into operations having different functionality than shown. Furthermore, the exemplary technique shown in FIG. 12 can be complementary to other exemplary techniques, methods, and/or procedures disclosed herein, such that they can be used cooperatively to provide benefits, advantages, and/or solutions to various problems, including those described herein.

FIG. 12 is similar in many ways to the signaling flows shown in FIGS. 10-11 and described above. As such, the same reference numbers are used and only the primary differences will be described below. One notable difference with FIG. 11 is that the UE only stores the current measurement configuration and the network ensures that there is no mismatch between the UE's stored measurement configuration the network's stored measurement configuration for the UE.

After receiving the target node response including measConfig*, the source node then determines the measConfig' needed so that the UE can detect and/or monitor the condition triggering the mobility operation. The source node sends the UE a conditional mobility command that includes a first indication of the mobility operation to be performed, a second indication of the triggering condition, and the measConfig' related to detecting the triggering condition. However, the source node does not send to the UE the measConfig* (determined by the target node) related to execution of the mobility operation with the target node.

In some embodiments, the conditional mobility command can include an empty measConfig to be used when performing measurements in the target cell after the detection of the triggering condition. In such case, the UE can infer from this empty configuration that measConfig' should be used for performing measurements in the target cell after the detection of the triggering condition. In such case, the source node can also inform all candidate target nodes of the measConfig' that the source node has configured for such UE measurements.

Upon receiving this command, the UE stores measConfig' separately from measConfig that was previously received. In other words, the UE maintains measConfig rather than simply updating it with the delta in measConfig' as conventionally performed. For example, measConfig' can be stored in a different VarMeasConfig' or VarMeasConfigCHO. Alternately, measConfig' can be stored in the same VarMeasConfig used but having different fields so that it can be distinguished as being associated with conditional mobility (e.g., CHO). The UE also uses measConfig' to begin performing measurements for detecting the indicated triggering condition.

Once the UE detects the triggering condition, it executes the mobility operation indicated by the conditional mobility command. When executing the mobility operation, the UE stops performing measurements in the source cell using measConfig', accesses the target cell (including, e.g., RRCReconfiguration-Complete message), and starts performing and reporting measurements in the target cell based on measConfig'. Since the target node (i.e., serving the target cell) received measConfig', it is fully aware of the measurements being reported by the UE during execution of the mobility operation, such that a mismatch is avoided. However, the target node may also determine that a reconfiguration is needed for UE measurements in the target cell. In such case, the target node can send a reconfiguration message to the UE that includes measConfig*. Alternately, the target node can send a different configuration than measConfig* (e.g., measConfig**), based on determining that such a different configuration would be desirable and/or beneficial in some way.

In the embodiments illustrated by FIG. 12, the configurations measConfig, measConfig', measConfig*, and measConfig* can be communicated as delta or full configurations in the same various ways described above with respect to FIG. 11.

The embodiments described above can be further illustrated with reference to FIGS. 13-15, which depict exemplary methods (e.g., procedures) performed by a UE, a source RAN node, and a target RAN node, respectively. In other words, various features of the operations described below, with reference to FIGS. 13-15, correspond to various embodiments described above.

Figure 13:
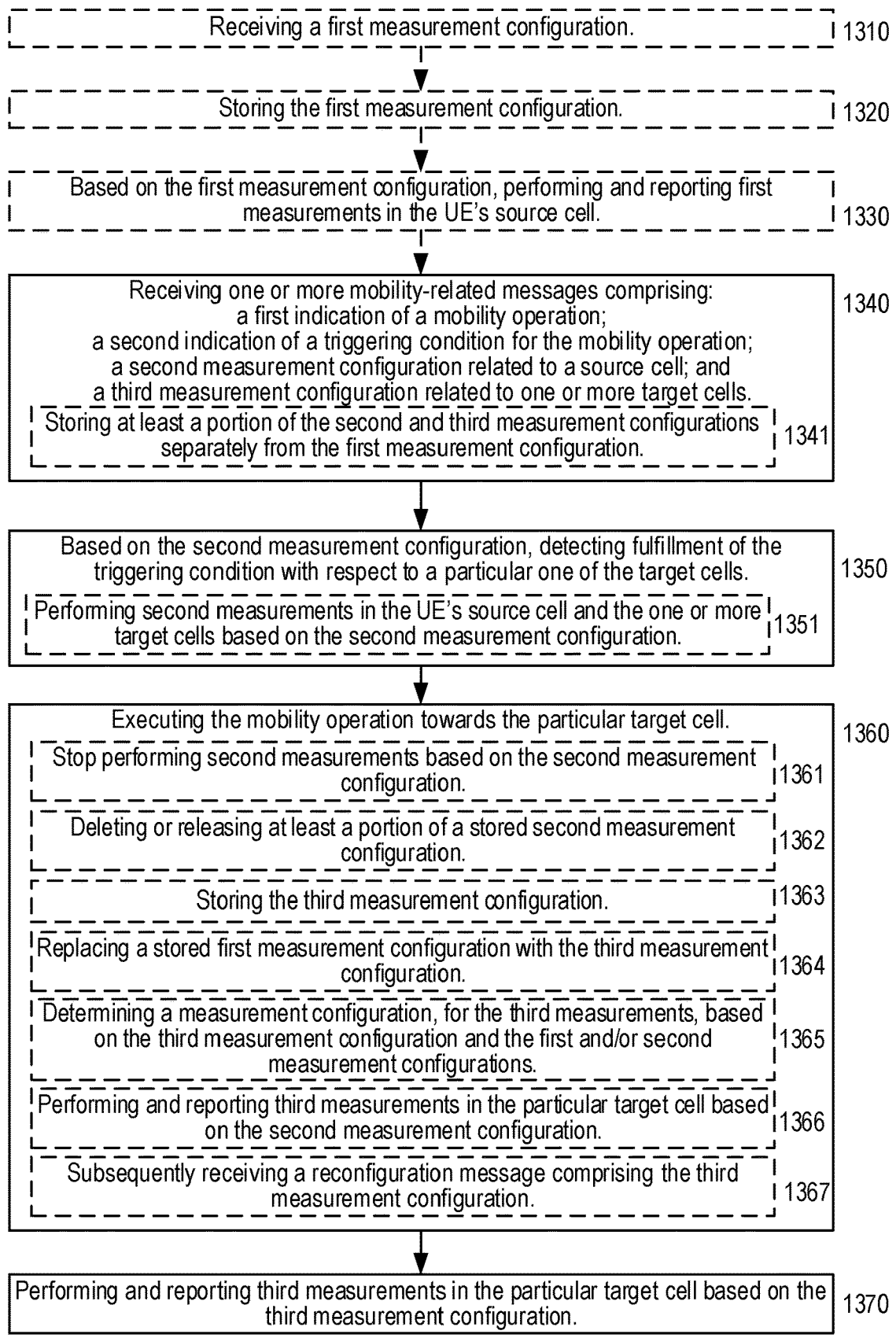
FIG. 13 illustrates an exemplary method and/or procedure performed by a user equipment (UE) for conditional mobility in a radio access network (RAN), according to various exemplary embodiments of the present disclosure.

In particular, FIG. 13 illustrates an exemplary method (e.g., procedure) for conditional mobility in a RAN, according to various exemplary embodiments of the present disclosure. The exemplary method can be performed by a user equipment (e.g., UE, wireless device, MTC device, NB-IoT device, modem, etc. or component thereof) in communication with a network node (e.g., base station, eNB, gNB, etc., or components thereof) serving a cell in the RAN (e.g., E-UTRAN, NG-RAN). For example, the exemplary method shown in FIG. 13 can be implemented in a UE or device configured according to other figures described herein.

Although the exemplary method is illustrated in FIG. 13 by specific blocks in a particular order, the operations corresponding to the blocks can be performed in different orders than shown and can be combined and/or divided into blocks having different functionality than shown. Furthermore, the exemplary method shown in FIG. 13 can be complementary to other exemplary methods disclosed herein (e.g., FIGS. 14-15), such that they can be used cooperatively to provide various benefits, advantages, and/or solutions to problems, including those described herein. Optional blocks and/or operations are indicated by dashed lines.

In some embodiments, the exemplary method can include the operations of block 1310-1330. In block 1310, the UE can receive, from a source RAN node serving the UE's source cell, a first measurement configuration (e.g., measConfig). In block 1320, the UE can store the received first measurement configuration (e.g., in varMeasConfig). In block 1330, the UE can perform and report first measurements in the UE's source cell based on the first measurement configuration. These operations can be performed, for example, before the operations of block 1340, discussed below.

The exemplary method can also include the operations of block 1340, where the UE can receive, from one or more RAN nodes, one or more mobility-related messages comprising: a first indication of a mobility operation (e.g., any of the mobility operations discussed above); a second indication of a triggering condition for the mobility operation; a second measurement configuration related to a source cell; and a third measurement configuration related to one or more target cells. For example, the second measurement configuration (e.g., measConfig') can be usable for detecting fulfilment of the triggering condition in the source cell, and the third measurement configuration (e.g., measConfig*) can be used in one of the target cells after executing the mobility operation.

In some embodiments, the operations of block 1340 can include the operations of sub-block 1341, where the UE can store at least a portion of the second measurement configuration and the third measurement configuration separately from the first measurement configuration (e.g., in varMeasConfig, varMeasConfig', varMeasConfig*, and/or varMeasConfigCHO).

In some embodiments, the one or more mobility-related messages can include a conditional mobility command received from a source RAN node. The conditional mobility command can include the first and second indications and the second and third measurement configurations. In addition, the second and third measurement configurations include respective measurement configurations for each target cell that is a candidate for the indicated mobility operation. In other words, each of the second measurement configuration and the third measurement configuration can include multiple measurement configurations, i.e., one for each of the candidate target cells.

In other embodiments, the one or more mobility-related messages can include two messages: a conditional mobility command, received from the source RAN node, that includes the first and second indications and the second measurement configuration; and a reconfiguration message, received from a target RAN node serving a target cell, that includes the third measurement configuration.

The exemplary method can also include the operations of blocks 1350-1360, where the UE can, based on the second measurement configuration, detect fulfilment of the triggering condition with respect to a particular one of the target cells and execute the mobility operation towards the particular target cell.

In some embodiments, detecting fulfillment of the triggering condition in block 1350 can include the operations of sub-block 1351, where the UE can perform second measurements in the source cell based on the second measurement configuration. In some embodiments, executing the mobility operation in block 1360 can include operations of one or more of sub-blocks 1361-1363. In sub-block 1361, the UE can stop performing second measurements based on the second measurement configuration. In sub-block 1362, the UE can delete or release at least a portion of a stored second measurement configuration. In sub-block 1363, the UE can store the third measurement configuration.

In some embodiments, the third measurement configuration can be received as a complete measurement configuration. In such embodiments, executing the mobility operation in block 1360 can include the operations of sub-block 1364, where the UE can replace a stored first measurement configuration with the third measurement configuration.

In other embodiments, the third measurement configuration can be received as a delta with respect to one or more of the first measurement configuration and the second measurement configuration. In such embodiments, executing the mobility operation in block 1360 can include the operations of sub-block 1365, where the UE can determine a measurement configuration, for the third measurements, based on the third measurement configuration and one or more of the first measurement configuration and the second measurement configuration.

In some embodiments, such as when the one or more mobility-related messages include a conditional mobility command and a reconfiguration message (discussed above), executing the mobility operation in block 1360 can include the operations of sub-blocks 1366-1367. In sub-block 1366, the UE can perform and reporting third measurements in the particular target cell based on the second measurement configuration (e.g., received in the conditional mobility command). In sub-block 1367, the UE can subsequently receive the reconfiguration message comprising the third measurement configuration.

The exemplary method can also include the operations of block 1370, where the UE can subsequently perform and report third measurements in the particular target cell based on the third measurement configuration.

Figure 14:
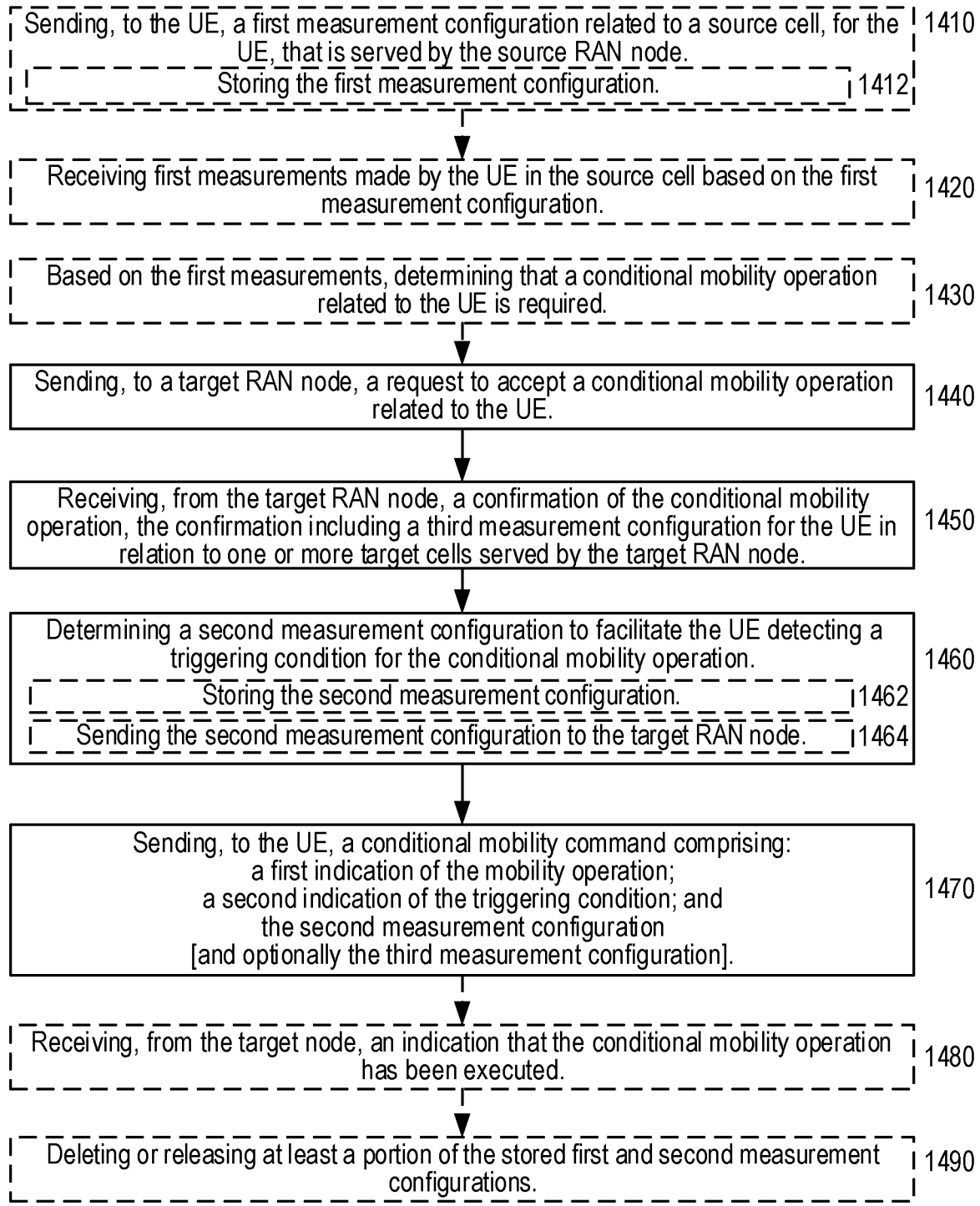
FIG. 14 illustrates an exemplary method and/or procedure performed by a source node, in a radio access network (RAN), for conditional mobility of a UE, according to various exemplary embodiments of the present disclosure.

In addition, FIG. 14 illustrates another exemplary method (e.g., procedure) for conditional mobility of a user equipment (UE) in a radio access network (RAN), according to various exemplary embodiments of the present disclosure. The exemplary method can be performed by a source RAN node (e.g., base station, eNB, gNB, etc., or component thereof) serving one or more user equipment (UEs, e.g., wireless devices, MTC devices, NB-IoT devices, modems, etc. or components thereof) in a cell of the RAN (e.g., E-UTRAN, NG-RAN). For example, the exemplary method shown in FIG. 14 can be implemented by a network node configured according to other figures described herein.

Although the exemplary method is illustrated in FIG. 14 by specific blocks in a particular order, the operations corresponding to the blocks can be performed in different orders than shown and can be combined and/or divided into blocks having different functionality than shown. Furthermore, the exemplary method shown in FIG. 14 can be complementary to other exemplary methods disclosed herein (e.g., FIGS. 13 and 15), such that they can be used cooperatively to provide various benefits, advantages, and/or solutions to problems, including those described herein. Optional blocks and/or operations are indicated by dashed lines.

In some embodiments, the exemplary method can include the operations of block 1410-1430. In block 1410, the source RAN node can send, to the UE, a first measurement configuration (e.g., measConfig) related to a source cell, for the UE, that is served by the source RAN node. In some embodiments, the operations of block 1410 can include the operations of sub-block 1412, where the source RAN node can store the first measurement configuration (e.g., in varMeasConfig). In block 1420, the source RAN node can receive first measurements made by the UE in the source cell based on the first measurement configuration. In block 1430, the source RAN node can determine that a mobility operation is required for the UE, based on the first measurements.

The exemplary method can also include the operations of block 1440, where the source RAN node can send, to a target RAN node, a request to accept a mobility operation (e.g., CHO) related to the UE. In some embodiments, the request can include the first measurement configuration for the UE (e.g., measConfig). The mobility operation can be the mobility operation determined to be required in block 1430. The exemplary method can also include the operations of block 1450, where the source RAN node can receive, from the target RAN node, a confirmation of the mobility operation, the confirmation including a third measurement configuration UE (e.g., measConfig*) related to one or more target cells served by the target RAN node.

The exemplary method can also include the operations of block 1460, where the source RAN node can determine a second measurement configuration (e.g., measConfig') related to a triggering condition for the mobility operation. For example, the second measurement configuration can be usable for detecting fulfilment of the triggering condition in the source cell. In some embodiments, the operations of block 1460 can include the operations of sub-block 1462, where the source RAN node can store the second measurement configuration (e.g., in varMeasConfig' or varMeasConfigCHO). In some embodiments, the operations of block 1460 can include the operations of sub-block 1464, where the source RAN node can send the second measurement configuration to the target RAN node.

The exemplary method can also include the operations of block 1470, where the source RAN node can send, to the UE, a mobility-related message comprising: a first indication of a mobility operation (e.g., any of the mobility operations discussed above); a second indication of a triggering condition for the mobility operation; and the second measurement configuration (e.g., measConfig'). In some embodiments, the mobility-related message can also include the third measurement configuration (e.g., measConfig*). In addition, the second and third measurement configurations include respective measurement configurations for each target cell that is a candidate for the indicated mobility operation. In other words, each of the second measurement configuration and the third measurement configuration can include multiple measurement configurations, i.e., one for each of the candidate target cells.

In some embodiments, the exemplary method can also include the operations of blocks 1480-1490. In block 1480, the source RAN node can receive, from the target RAN node, a third indication that the mobility operation has been completed. In block 1490, the source RAN node can, in response to the third indication, delete or release at least a portion of the stored first and second measurement configurations.

In some embodiments, at least one of the following conditions apply: the second measurement configuration is determined as a delta with respect to the first measurement configuration; the third measurement configuration is received as a delta with respect to the first measurement configuration; and the third measurement configuration is received as a delta with respect to the first and the second measurement configurations.

Figure 15:
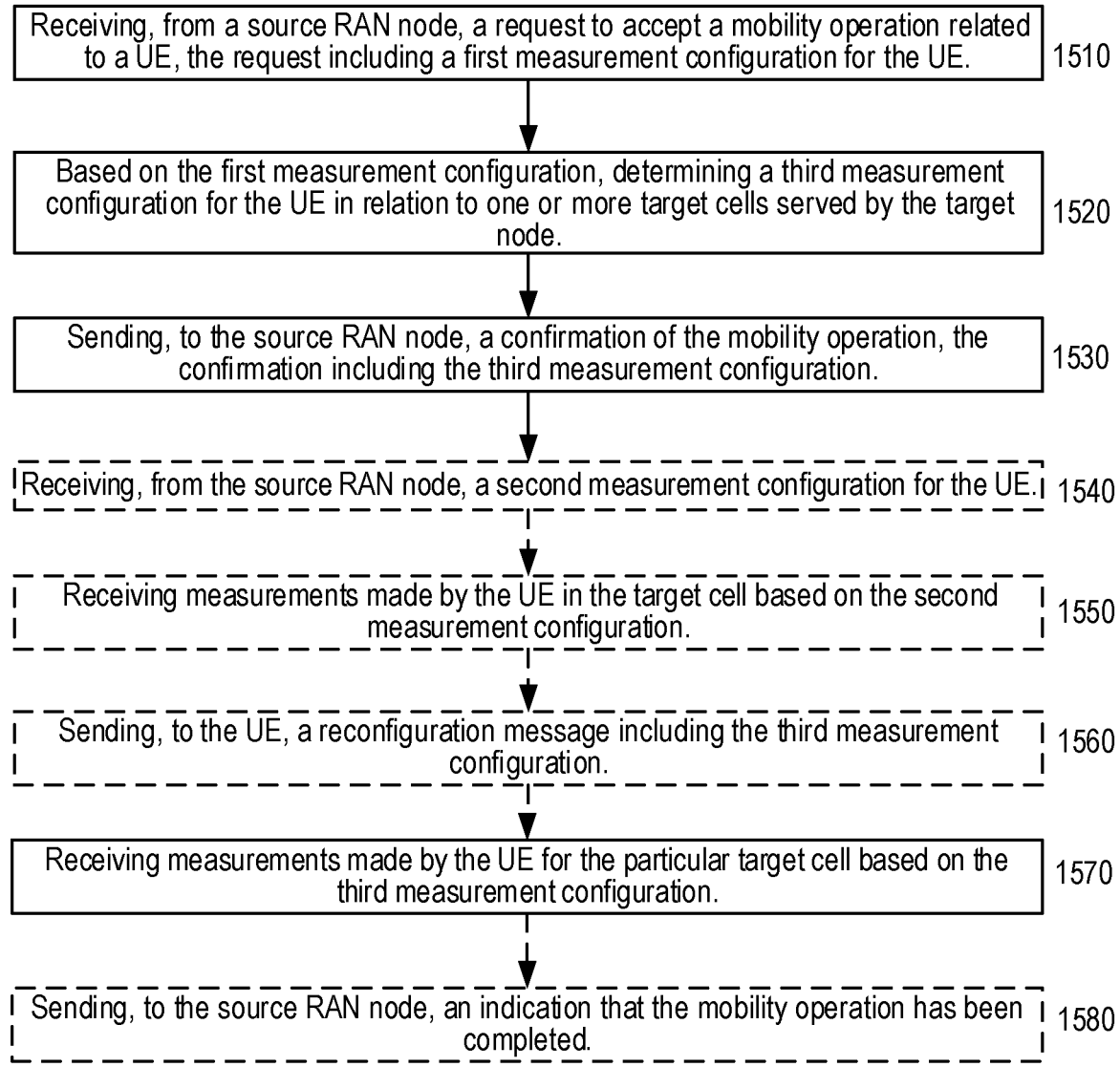
FIG. 15 illustrates an exemplary method and/or procedure performed by a target node, in a radio access network (RAN), for conditional mobility of a UE, according to various exemplary embodiments of the present disclosure.

In addition, FIG. 15 illustrates another exemplary method (e.g., procedure) for conditional mobility of a user equipment (UE) in a radio access network (RAN), according to various exemplary embodiments of the present disclosure. The exemplary method can be performed by a target RAN node (e.g., base station, eNB, gNB, etc., or component thereof) (UEs, e.g., wireless devices, MTC devices, NB-IoT devices, modems, etc. or components thereof) serving a target cell in the RAN (e.g., E-UTRAN, NG-RAN). For example, the exemplary method shown in FIG. 15 can be implemented by a network node configured according to other figures described herein.

Although the exemplary method is illustrated in FIG. 15 by specific blocks in a particular order, the operations corresponding to the blocks can be performed in different orders than shown and can be combined and/or divided into blocks having different functionality than shown. Furthermore, the exemplary method shown in FIG. 15 can be complementary to other exemplary methods disclosed herein (e.g., FIGS. 13-14), such that they can be used cooperatively to provide various benefits, advantages, and/or solutions to problems, including those described herein. Optional blocks and/or operations are indicated by dashed lines.

The exemplary method can include the operations of block 1510, where the target RAN node can receive, from a source RAN node, a request to accept a mobility operation (e.g., CHO) related to the UE. The request can include a first measurement configuration for the UE (e.g., measConfig). The exemplary method can also include the operations of block 1520, where the target RAN node can determine a third measurement configuration (e.g., measConfig*) for the UE in relation to one or more target cells served by the target RAN node. The third measurement configuration can be based on (e.g., a delta with respect to) the first measurement configuration.

The exemplary method can also include the operations of block 1530, where the target RAN node can send, to the source RAN node, a confirmation of the mobility operation, the confirmation including the third measurement configuration. In various embodiments, the third measurement configuration can be sent as a complete measurement configuration, or as a delta with respect to the first measurement configuration and/or the second measurement configuration. The exemplary method can also include the operations of block 1570, where the target RAN node can receive, from the UE, measurements made in a particular one of the target cells based on the third measurement configuration.

In some embodiments, the exemplary method can also include the operations of block 1550-1560. In block 1550, the target RAN node can receive measurements made by the UE for the particular target cell based on the second measurement configuration. In block 1560, the target RAN node can subsequently send, to the UE, a reconfiguration message including the third measurement configuration.

In these embodiments, the exemplary method can also include the operations of block 1540, where the target RAN node can receive, from the source RAN node, a second measurement configuration for the UE. The second measurement configuration (e.g., measConfig) can be received as a delta with respect to the first measurement configuration (e.g., measConfig). In such embodiments, the third measurement configuration, included in the reconfiguration message, is a delta with respect to the first measurement configuration and the second measurement configuration.

In some embodiments, the exemplary method can also include the operations of block 1580, where the target RAN node can send, to the source RAN node, an indication that the mobility operation has been completed.

Figure 16:
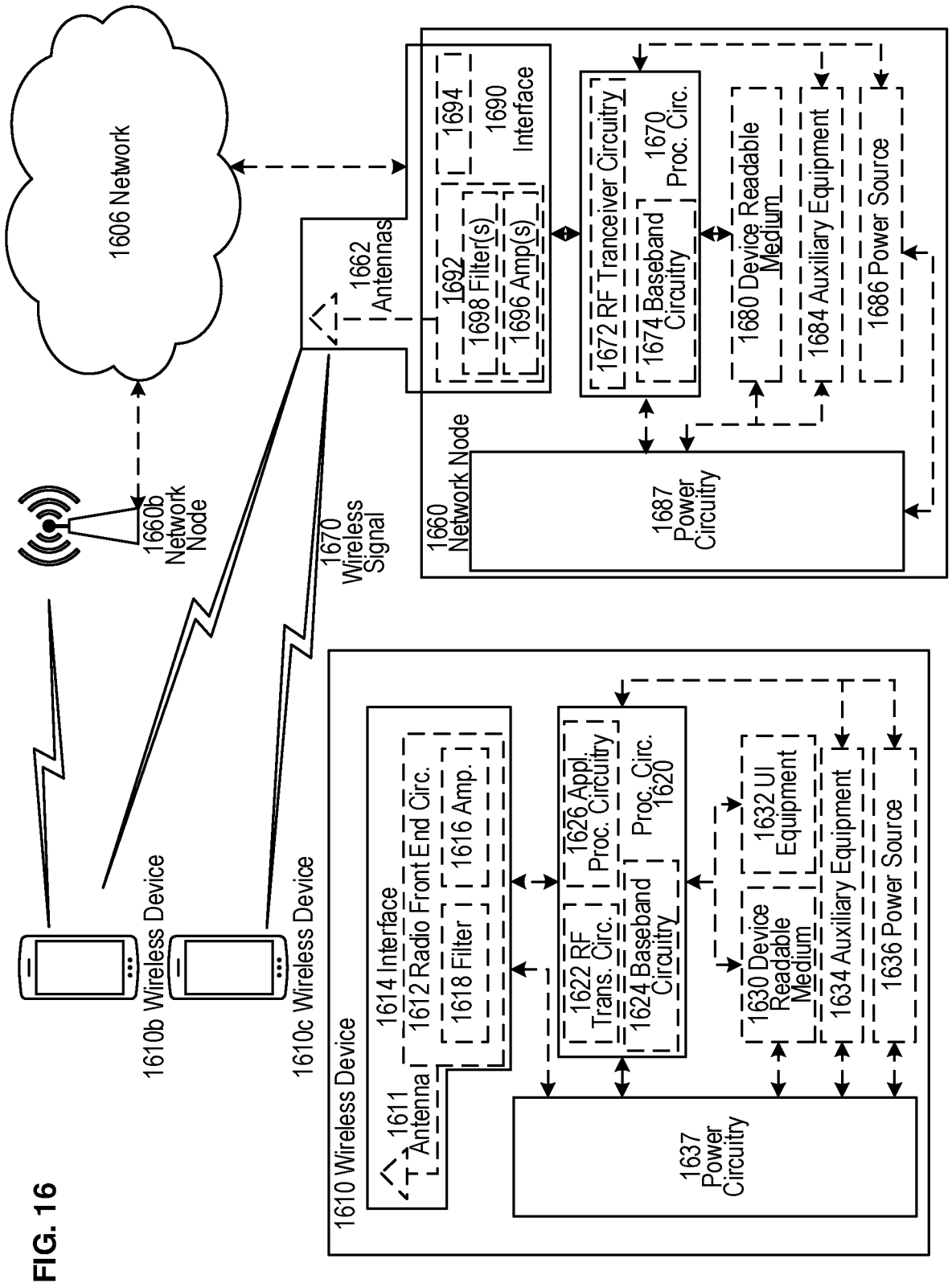
FIG. 16 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660*b*, and WDs 1610, 1610*b*, and 1610*c*. In practice, a wireless network can further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment to such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1660 are depicted as single boxes located within a larger box, or nested within multiple boxes, in practice, a network node can comprise multiple different physical components that make up a single illustrated component (e.g., device readable medium 1680 can comprise multiple separate hard drives as well as multiple RAM modules).

Similarly, network node 1660 can be composed of multiple physically separate components (e.g., a NodeB component and a RNC component, or a BTS component and a BSC component, etc.), which can each have their own respective components. In certain scenarios in which network node 1660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1660 can be configured to support multiple radio access technologies (RATs). In such embodiments, some components can be duplicated (e.g., separate device readable medium 1680 for the different RATs) and some components can be reused (e.g., the same antenna 1662 can be shared by the RATs). Network node 1660 can also include multiple sets of the various illustrated components for different wireless technologies integrated into network node 1660, such as, for example, GSM, WCDMA, LTE, NR, WiFi, or Bluetooth wireless technologies. These wireless technologies can be integrated into the same or different chip or set of chips and other components within network node 1660.

Processing circuitry 1670 can be configured to perform any determining, calculating, or similar operations (e.g., certain obtaining operations) described herein as being provided by a network node. These operations performed by processing circuitry 1670 can include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1660, either alone or in conjunction with other network node 1660 components (e.g., device readable medium 1680). Such functionality can include any of the various wireless features, functions, or benefits discussed herein.

For example, processing circuitry 1670 can execute instructions stored in device readable medium 1680 or in memory within processing circuitry 1670. In some embodiments, processing circuitry 1670 can include a system on a chip (SOC). As a more specific example, instructions (also referred to as a computer program product) stored in medium 1680 can include instructions that, when executed by processing circuitry 1670, can configure network node 1660 to perform operations corresponding to various exemplary methods (e.g., procedures) described herein.

In some embodiments, processing circuitry 1670 can include one or more of radio frequency (RF) transceiver circuitry 1672 and baseband processing circuitry 1674. In some embodiments, radio frequency (RF) transceiver circuitry 1672 and baseband processing circuitry 1674 can be on separate chips (or sets of chips), boards, or units, such as radio units and digital units. In alternative embodiments, part or all of RF transceiver circuitry 1672 and baseband processing circuitry 1674 can be on the same chip or set of chips, boards, or units In certain embodiments, some or all of the functionality described herein as being provided by a network node, base station, eNB or other such network device can be performed by processing circuitry 1670 executing instructions stored on device readable medium 1680 or memory within processing circuitry 1670. In alternative embodiments, some or all of the functionality can be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660 but are enjoyed by network node 1660 as a whole, and/or by end users and the wireless network generally.

Device readable medium 1680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1670. Device readable medium 1680 can store any suitable instructions, data or information, including a computer program, software, an application including one or more of logic, rules, code, tables, etc. and/or other instructions capable of being executed by processing circuitry 1670 and, utilized by network node 1660. Device readable medium 1680 can be used to store any calculations made by processing circuitry 1670 and/or any data received via interface 1690. In some embodiments, processing circuitry 1670 and device readable medium 1680 can be considered to be integrated.

Interface 1690 is used in the wired or wireless communication of signaling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that can be coupled to, or in certain embodiments a part of, antenna 1662. Radio front end circuitry 1692 comprises filters 1698 and amplifiers 1696. Radio front end circuitry 1692 can be connected to antenna 1662 and processing circuitry 1670. Radio front end circuitry can be configured to condition signals communicated between antenna 1662 and processing circuitry 1670. Radio front end circuitry 1692 can receive digital data that is to be sent out to to other network nodes or WDs via a wireless connection. Radio front end circuitry 1692 can convert the digital data into a radio signal having the appropriate channel and bandwidth parameters using a combination of filters 1698 and/or amplifiers 1696. The radio signal can then be transmitted via antenna 1662. Similarly, when receiving data, antenna 1662 can collect radio signals which are then converted into digital data by radio front end circuitry 1692. The digital data can be passed to processing circuitry 1670. In other embodiments, the interface can comprise different components and/or different combinations of components.

In certain alternative embodiments, network node 1660 may not include separate radio front end circuitry 1692, instead, processing circuitry 1670 can comprise radio front end circuitry and can be connected to antenna 1662 without separate radio front end circuitry 1692. Similarly, in some embodiments, all or some of RF transceiver circuitry 1672 can be considered a part of interface 1690. In still other embodiments, interface 1690 can include one or more ports or terminals 1694, radio front end circuitry 1692, and RF transceiver circuitry 1672, as part of a radio unit (not shown), and interface 1690 can communicate with baseband processing circuitry 1674, which is part of a digital unit (not shown).

Antenna 1662 can include one or more antennas, or antenna arrays, configured to send and/or receive wireless signals. Antenna 1662 can be coupled to radio front end circuitry 1690 and can be any type of antenna capable of transmitting and receiving data and/or signals wirelessly. In some embodiments, antenna 1662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1662 can be separate from network node 1660 and can be connectable to network node 1660 through an interface or port.

Antenna 1662, interface 1690, and/or processing circuitry 1670 can be configured to perform any receiving operations and/or certain obtaining operations described herein as being performed by a network node. Any information, data and/or signals can be received from a wireless device, another network node and/or any other network equipment. Similarly, antenna 1662, interface 1690, and/or processing circuitry 1670 can be configured to perform any transmitting operations described herein as being performed by a network node. Any information, data and/or signals can be transmitted to a wireless device, another network node to and/or any other network equipment.

Power circuitry 1687 can comprise, or be coupled to, power management circuitry and can be configured to supply the components of network node 1660 with power for performing the functionality described herein. Power circuitry 1687 can receive power from power source 1686. Power source 1686 and/or power circuitry 1687 can be configured to provide power to the various components of network node 1660 in a form suitable for the respective components (e.g., at a voltage and current level needed for each respective component). Power source 1686 can either be included in, or external to, power circuitry 1687 and/or network node 1660. For example, network node 1660 can be connectable to an external power source (e.g., an electricity outlet) via an input circuitry or interface such as an electrical cable, whereby the external power source supplies power to power circuitry 1687. As a further example, power source 1686 can comprise a source of power in the form of a battery or battery pack which is connected to, or integrated in, power circuitry 1687. The battery can provide backup power should the external power source fail. Other types of power sources, such as photovoltaic devices, can also be used.

Alternative embodiments of network node 1660 can include additional components beyond those shown in FIG. 16 that can be responsible for providing certain aspects of the network node's functionality, including any of the functionality described herein and/or any functionality necessary to support the subject matter described herein. For example, network node 1660 can include user interface equipment to allow and/or facilitate input of information into network node 1660 and to allow and/or facilitate output of information from network node 1660. This can allow and/or facilitate a user to perform diagnostic, maintenance, repair, and other administrative functions for network node 1660.

In some embodiments, a wireless device (WD, e.g., WD 1610) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 can include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies can be integrated into the same or different chips or set of chips as other components within WD 1610.

Antenna 1611 can include one or more antennas or antenna arrays, configured to send and/or receive wireless signals, and is connected to interface 1614. In certain alternative embodiments, antenna 1611 can be separate from WD 1610 and be connectable to WD 1610 through an interface or port. Antenna 1611, interface 1614, and/or processing circuitry 1620 can be configured to perform any receiving or transmitting operations described herein as being performed by a WD. Any information, data and/or signals can be received from a network node and/or another WD. In some embodiments, radio front end circuitry and/or antenna 1611 can be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620 and can be configured to condition signals communicated between antenna 1611 and processing circuitry 1620. Radio front end circuitry 1612 can be coupled to or a part of antenna 1611. In some embodiments, WD 1610 may not include separate radio front end circuitry 1612; rather, processing circuitry 1620 can comprise radio front end circuitry and can be connected to antenna 1611. Similarly, in some embodiments, some or all of RF transceiver circuitry 1622 can be considered a part of interface 1614. Radio front end circuitry 1612 can receive digital data that is to be sent out to other network nodes or WDs via a wireless connection. Radio front end circuitry 1612 can convert the digital data into a radio signal having the appropriate channel and bandwidth parameters using a combination of filters 1618 and/or amplifiers 1616. The radio signal can then be transmitted via antenna 1611. Similarly, when receiving data, antenna 1611 can collect radio signals which are then converted into digital data by radio front end circuitry 1612. The digital data can be passed to processing circuitry 1620. In other embodiments, the interface can comprise different components and/or different combinations of components.

Processing circuitry 1620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1610 functionality either alone or in combination with other WD 1610 components, such as device readable medium 1630. Such functionality can include any of the various wireless features or benefits discussed herein.

For example, processing circuitry 1620 can execute instructions stored in device readable medium 1630 or in memory within processing circuitry 1620 to provide the functionality disclosed herein. More specifically, instructions (also referred to as a computer program product) stored in medium 1630 can include instructions that, when executed by processor 1620, can configure wireless device 1610 to perform operations corresponding to various exemplary methods (e.g., procedures) described herein.

As illustrated, processing circuitry 1620 includes one or more of RF transceiver circuitry 1622, baseband processing circuitry 1624, and application processing circuitry 1626. In other embodiments, the processing circuitry can comprise different components and/or different combinations of components. In certain embodiments processing circuitry 1620 of WD 1610 can comprise a SOC. In some embodiments, RF transceiver circuitry 1622, baseband processing circuitry 1624, and application processing circuitry 1626 can be on separate chips or sets of chips. In alternative embodiments, part or all of baseband processing circuitry 1624 and application processing circuitry 1626 can be combined into one chip or set of chips, and RF transceiver circuitry 1622 can be on a separate chip or set of chips. In still alternative embodiments, part or all of RF transceiver circuitry 1622 and baseband processing circuitry 1624 can be on the same chip or set of chips, and application processing circuitry 1626 can be on a separate chip or set of chips. In yet other alternative embodiments, part or all of RF transceiver circuitry 1622, baseband processing circuitry 1624, and application processing circuitry 1626 can be combined in the same chip or set of chips. In some embodiments, RF transceiver circuitry 1622 can be a part of interface 1614. RF transceiver circuitry 1622 can condition RF signals for processing circuitry 1620.

In certain embodiments, some or all of the functionality described herein as being performed by a WD can be provided by processing circuitry 1620 executing instructions stored on device readable medium 1630, which in certain embodiments can be a computer-readable storage medium. In alternative embodiments, some or all of the functionality can be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 can be configured to perform any determining, calculating, or similar operations (e.g., certain obtaining operations) described herein as being performed by a WD. These operations, as performed by processing circuitry 1620, can include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 can be operable to store a computer program, software, an application including one or more of logic, rules, code, tables, etc. and/or other instructions capable of being executed by processing circuitry 1620. Device readable medium 1630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1620. In some embodiments, processing circuitry 1620 and device readable medium 1630 can be considered to be integrated.

User interface equipment 1632 can include components that allow and/or facilitate a human user to interact with WD 1610. Such interaction can be of many forms, such as visual, audial, tactile, etc. User interface equipment 1632 can be operable to produce output to the user and to allow and/or facilitate the user to provide input to WD 1610. The type of interaction can vary depending on the type of user interface equipment 1632 installed in WD 1610. For example, if WD 1610 is a smart phone, the interaction can be via a touch screen; if WD 1610 is a smart meter, the interaction can be through a screen that provides usage (e.g., the number of gallons used) or a speaker that provides an audible alert (e.g., if smoke is detected). User interface equipment 1632 can include input interfaces, devices and circuits, and output interfaces, devices and circuits. User interface equipment 1632 can be configured to allow and/or facilitate input of information into WD 1610 and is connected to processing circuitry 1620 to allow and/or facilitate processing circuitry 1620 to process the input information. User interface equipment 1632 can include, for example, a microphone, a proximity or other sensor, keys/buttons, a touch display, one or more cameras, a USB port, or other input circuitry. User interface equipment 1632 is also configured to allow and/or facilitate output of information from WD 1610, and to allow and/or facilitate processing circuitry 1620 to output information from WD 1610. User interface equipment 1632 can include, for example, a speaker, a display, vibrating circuitry, a USB port, a headphone interface, or other output circuitry. Using one or more input and output interfaces, devices, and circuits, of user interface equipment 1632, WD 1610 can communicate with end users and/or the wireless network and allow and/or facilitate them to benefit from the functionality described herein.

Auxiliary equipment 1634 is operable to provide more specific functionality which may not be generally performed by WDs. This can comprise specialized sensors for doing measurements for various purposes, interfaces for additional types of communication such as wired communications etc. The inclusion and type of components of auxiliary equipment 1634 can vary depending on the embodiment and/or scenario.

Power source 1636 can, in some embodiments, be in the form of a battery or battery pack. Other types of power sources, such as an external power source (e.g., an electricity outlet), photovoltaic devices or power cells, can also be used. WD 1610 can further comprise power circuitry 1637 for delivering power from power source 1636 to the various parts of WD 1610 which need power from power source 1636 to carry out any functionality described or indicated herein. Power circuitry 1637 can in certain embodiments comprise power management circuitry. Power circuitry 1637 can additionally or alternatively be operable to receive power from an external power source; in which case WD 1610 can be connectable to the external power source (such as an electricity outlet) via input circuitry or an interface such as an electrical power cable. Power circuitry 1637 can also in certain embodiments be operable to deliver power from an external power source to power source 1636. This can be, for example, for the charging of power source 1636. Power circuitry 1637 can perform any converting or other modification to the power from power source 1636 to make it suitable for supply to the respective components of WD 1610.

Figure 17:
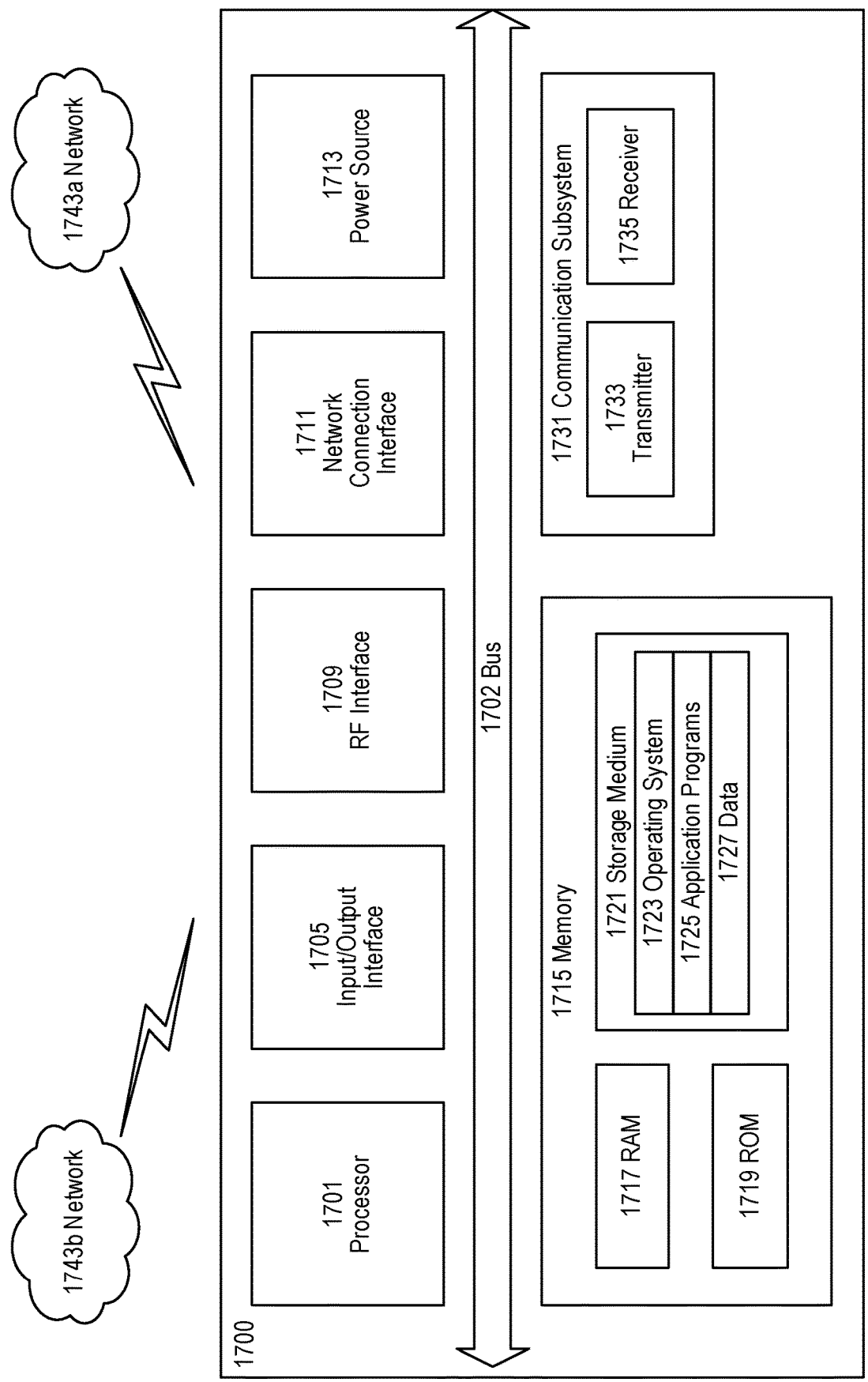
FIG. 17 illustrates an exemplary embodiment of a UE, in accordance with various aspects described herein.

FIG. 17 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 17200 can be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 can include other similar types of information. Certain UEs can utilize all of the components shown in FIG. 17, or only a subset of the components. The level of integration between the components can vary from one UE to another UE. Further, certain UEs can contain multiple instances of a component, such as multiple processors, memories, transceivers, transmitters, receivers, etc.

In FIG. 17, processing circuitry 1701 can be configured to process computer instructions and data. Processing circuitry 1701 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 can include two central processing units (CPUs). Data can be information in a form suitable for use by a computer.

In the depicted embodiment, input/output interface 1705 can be configured to provide a communication interface to an input device, output device, or input and output device. UE 1700 can be configured to use an output device via input/output interface 1705. An output device can use the same type of interface port as an input device. For example, a USB port can be used to provide input to and output from UE 1700. The output device can be a speaker, a sound card, a video card, a display, a monitor, a printer, an actuator, an emitter, a smartcard, another output device, or any combination thereof. UE 1700 can be configured to use an input device via input/output interface 1705 to allow and/or facilitate a user to capture information into UE 1700. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 17, RF interface 1709 can be configured to provide a communication interface to RF components such as a transmitter, a receiver, and an antenna. Network connection interface 1711 can be configured to provide a communication interface to network 1743a. Network 1743a can encompass wired and/or wireless networks such as a local-area network (LAN), a wide-area network (WAN), a computer network, a wireless network, a telecommunications network, another like network or any combination thereof. For example, network 1743a can comprise a Wi-Fi network. Network connection interface 1711 can be configured to include a receiver and a transmitter interface used to communicate with one or more other devices over a communication network according to one or more communication protocols, such as Ethernet, TCP/IP, SONET, ATM, or the like. Network connection interface 1711 can implement receiver and transmitter functionality appropriate to the communication network links (e.g., optical, electrical, and the like). The transmitter and receiver functions can share circuit components, software or firmware, or alternatively can be implemented separately.

RAM 1717 can be configured to interface via bus 1702 to processing circuitry 1701 to provide storage or caching of data or computer instructions during the execution of software programs such as the operating system, application programs, and device drivers. ROM 1719 can be configured to provide computer instructions or data to processing circuitry 1701. For example, ROM 1719 can be configured to store invariant low-level system code or data for basic system functions such as basic input and output (I/O), startup, or reception of keystrokes from a keyboard that are stored in a non-volatile memory. Storage medium 1721 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1721 can be configured to include operating system 1723; application program 1725 such as a web browser application, a widget or gadget engine or another application; and data file 1727. Storage medium 1721 can store, for use by UE 1700, any of a variety of various operating systems or combinations of operating systems. For example, application program 1725 can include executable program instructions (also referred to as a computer program product) that, when executed by processor 1701, can configure UE 1700 to perform operations corresponding to various exemplary methods (e.g., procedures) described herein.

Storage medium 1721 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 can allow and/or facilitate UE 1700 to access computer-executable instructions, application programs or the like, stored on transitory or non-transitory memory media, to off-load data, or to upload data. An article of manufacture, such as one utilizing a communication system can be tangibly embodied in storage medium 1721, which can comprise a device readable medium.

In FIG. 17, processing circuitry 1701 can be configured to communicate with network 1743*b* using communication subsystem 1731. Network 1743*a* and network 1743*b* can be the same network or networks or different network or networks. Communication subsystem 1731 can be configured to include one or more transceivers used to communicate with network 1743*b*. For example, communication subsystem 1731 can be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver can include transmitter 1733 and/or receiver 1735 to implement transmitter or receiver functionality, respectively, appropriate to the RAN links (e.g., frequency allocations and the like). Further, transmitter 1733 and receiver 1735 of each transceiver can share circuit components, software or firmware, or alternatively can be implemented separately.

In the illustrated embodiment, the communication functions of communication subsystem 1731 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 can include cellular communication, Wi-Fi communication, Bluetooth communication, and GPS communication. Network 1743*b* can encompass wired and/or wireless networks such as a local-area network (LAN), a wide-area network (WAN), a computer network, a wireless network, a telecommunications network, another like network or any combination thereof. For example, network 1743*b* can be a cellular network, a Wi-Fi network, and/or a near-field network. Power source 1713 can be configured to provide alternating current (AC) or direct current (DC) power to components of UE 1700.

The features, benefits and/or functions described herein can be implemented in one of the components of UE 1700 or partitioned across multiple components of UE 1700. Further, the features, benefits, and/or functions described herein can be implemented in any combination of hardware, software or firmware. In one example, communication subsystem 1731 can be configured to include any of the components described herein. Further, processing circuitry 1701 can be configured to communicate with any of such components over bus 1702. In another example, any of such components can be represented by program instructions stored in memory that when executed by processing circuitry 1701 perform the corresponding functions described herein. In another example, the functionality of any of such components can be partitioned between processing circuitry 1701 and communication subsystem 1731. In another example, the non-computationally intensive functions of any of such components can be implemented in software or firmware and the computationally intensive functions can be implemented in hardware.

Figure 18:
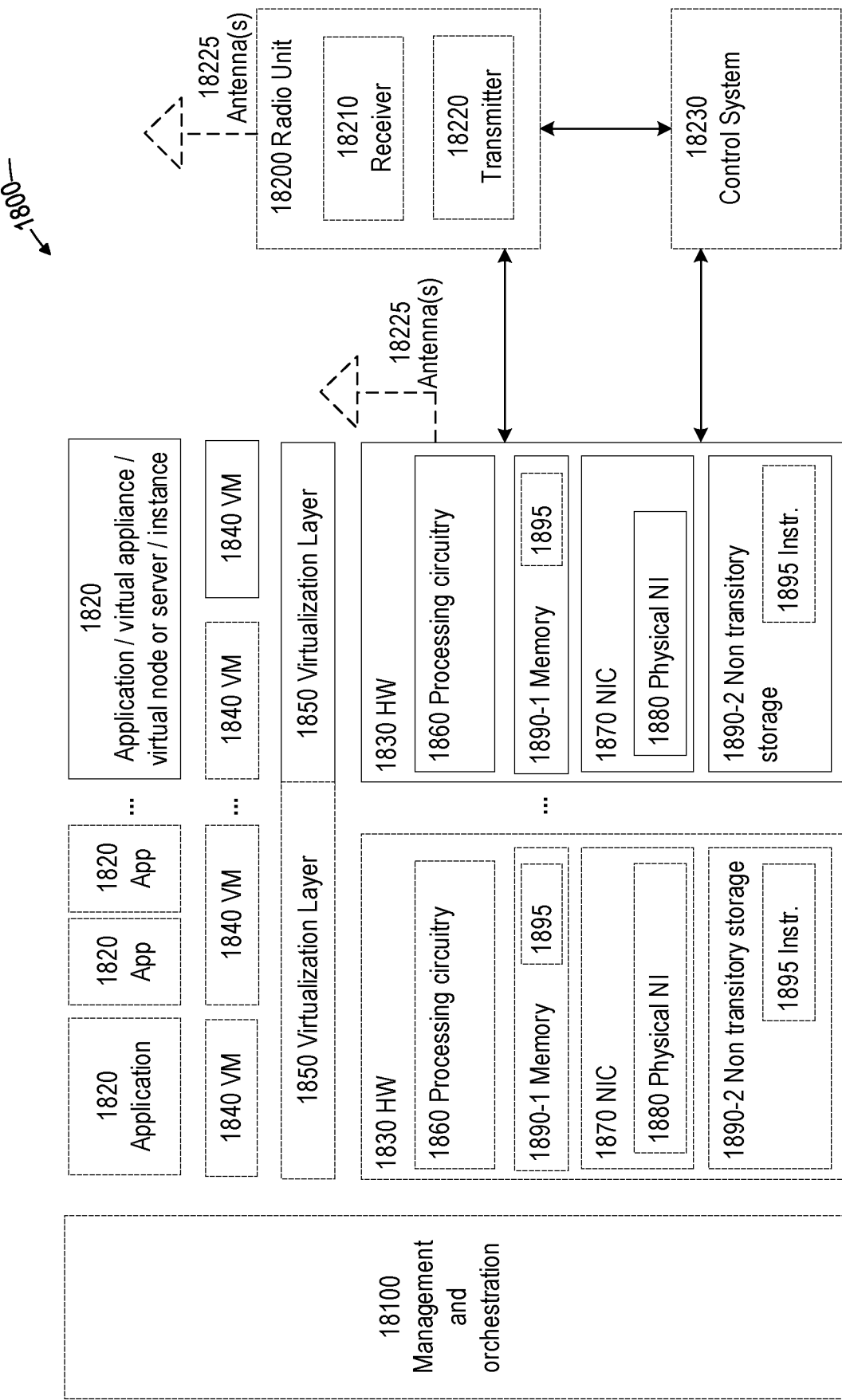
FIG. 18 is a block diagram illustrating an exemplary virtualization environment usable for implementation of various embodiments of network nodes described herein.

FIG. 18 is a schematic block diagram illustrating a virtualization environment 1800 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node can be entirely virtualized.

The functions can be implemented by one or more applications 1820 (which can alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800 can include general-purpose or special-purpose network hardware devices (or nodes) 1830 comprising a set of one or more processors or processing circuitry 1860, which can be commercial off-the-shelf (COTS) processors, dedicated Application Specific Integrated Circuits (ASICs), or any other type of processing circuitry including digital or analog hardware components or special purpose processors. Each hardware device can comprise memory 1890-1 which can be non-persistent memory for temporarily storing instructions 1895 or software executed by processing circuitry 1860. For example, instructions 1895 can include program instructions (also referred to as a computer program product) that, when executed by processing circuitry 1860, can configure hardware node 1820 to perform operations corresponding to various exemplary methods (e.g., procedures) described herein. Such operations can also be attributed to virtual node(s) 1820 that is/are hosted by hardware node 1830.

Each hardware device can comprise one or more network interface controllers (NICs) 1870, also known as network interface cards, which include physical network interface 1880. Each hardware device can also include non-transitory, persistent, machine-readable storage media 1890-2 having stored therein software 1895 and/or instructions executable by processing circuitry 1860. Software 1895 can include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and can be run by a corresponding virtualization layer 1850 or hypervisor. Different embodiments of the instance of virtual appliance 1820 can be implemented on one or more of virtual machines 1840, and the implementations can be made in different ways.

During operation, processing circuitry 1860 executes software 1895 to instantiate the hypervisor or virtualization layer 1850, which can sometimes be referred to as a virtual machine monitor (VMM). Virtualization layer 1850 can present a virtual operating platform that appears like networking hardware to virtual machine 1840.

As shown in FIG. 18, hardware 1830 can be a standalone network node with generic or specific components. Hardware 1830 can comprise antenna 18225 and can implement some functions via virtualization. Alternatively, hardware 1830 can be part of a larger cluster of hardware (e.g., such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1840 can be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 can be coupled to one or more antennas 18225. Radio units 18200 can communicate directly with hardware nodes 1830 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 18230, which can alternatively be used for communication between the hardware nodes 1830 and radio units 18200.

Figure 19:
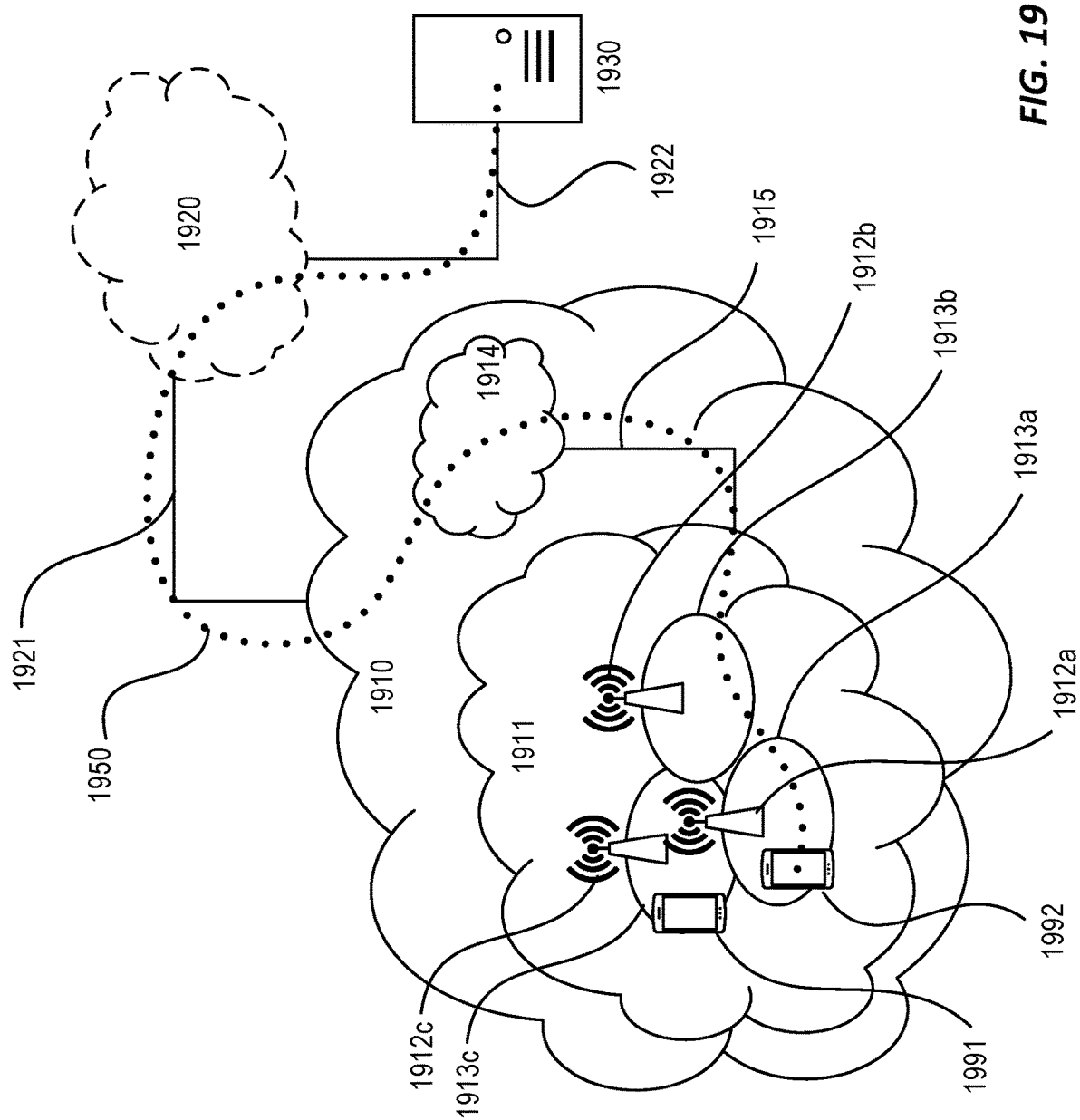
FIGS. 19-20 are block diagrams of various exemplary communication systems and/or networks, in accordance with various aspects described herein.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* can be configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the Telecommunication network 1910 is itself connected to host computer 1930, which can be embodied in the hardware and/or software of a standalone server, a cloud-implemented server, a distributed server or as processing resources in a server farm. Host computer 1930 can be under the ownership or control of a service provider or can be operated by the service provider or on behalf of the service provider. Connections 1921 and 1922 between telecommunication network 1910 and host computer 1930 can extend directly from core network 1914 to host computer 1930 or can go via an optional intermediate network 1920. Intermediate network 1920 can be one of, or a combination of more than one of, a public, private or hosted network; intermediate network 1920, if any, can be a backbone network or the Internet; in particular, intermediate network 1920 can comprise two or more sub-networks (not shown).

The communication system of FIG. 19 as a whole enables connectivity between the connected UEs 1991, 1992 and host computer 1930. The connectivity can be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 can be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which can have storage and/or processing capabilities. In particular, processing circuitry 2018 can comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 can be operable to provide a service to a remote user, such as UE 2030 connecting via OTT connection 2050 terminating at UE 2030 and host computer 2010. In providing the service to the remote user, host application 2012 can provide user data which is transmitted using OTT connection 2050.

Communication system 2000 can also include base station 2020 provided in a telecommunication system and comprising hardware 2025 enabling it to communicate with host computer 2010 and with UE 2030. Hardware 2025 can include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 can be configured to facilitate connection 2060 to host computer 2010. Connection 2060 can be direct, or it can pass through a core network (not shown in FIG. 20) of the telecommunication system and/or through one or more intermediate networks outside the telecommunication system. In the embodiment shown, hardware 2025 of base station 2020 can also include processing circuitry 2028, which can comprise one or more programmable processors, application-specific integrated circuits, field programmable gate arrays or combinations of these (not shown) adapted to execute instructions.

Base station 2020 also includes software 2021 stored internally or accessible via an external connection. For example, software 2021 can include program instructions (also referred to as a computer program product) that, when executed by processing circuitry 2028, can configure base station 2020 to perform operations corresponding to various exemplary methods (e.g., procedures) described herein.

Communication system 2000 can also include UE 2030 already referred to, whose hardware 2035 can include radio interface 2037 configured to set up and maintain wireless connection 2070 with a base station serving a coverage area in which UE 2030 is currently located. Hardware 2035 of UE 2030 can also include processing circuitry 2038, which can comprise one or more programmable processors, application-specific integrated circuits, field programmable gate arrays or combinations of these (not shown) adapted to execute instructions.

UE 2030 also includes software 2031, which is stored in or accessible by UE 2030 and executable by processing circuitry 2038. Software 2031 includes client application 2032. Client application 2032 can be operable to provide a service to a human or non-human user via UE 2030, with the support of host computer 2010. In host computer 2010, an executing host application 2012 can communicate with the executing client application 2032 via OTT connection 2050 terminating at UE 2030 and host computer 2010. In providing the service to the user, client application 2032 can receive request data from host application 2012 and provide user data in response to the request data. OTT connection 2050 can transfer both the request data and the user data. Client application 2032 can interact with the user to generate the user data that it provides. Software 2031 can also include program instructions (also referred to as a computer program product) that, when executed by processing circuitry 2038, can configure UE 2030 to perform operations corresponding to various exemplary methods (e.g., procedures) described herein.

Figure 20:
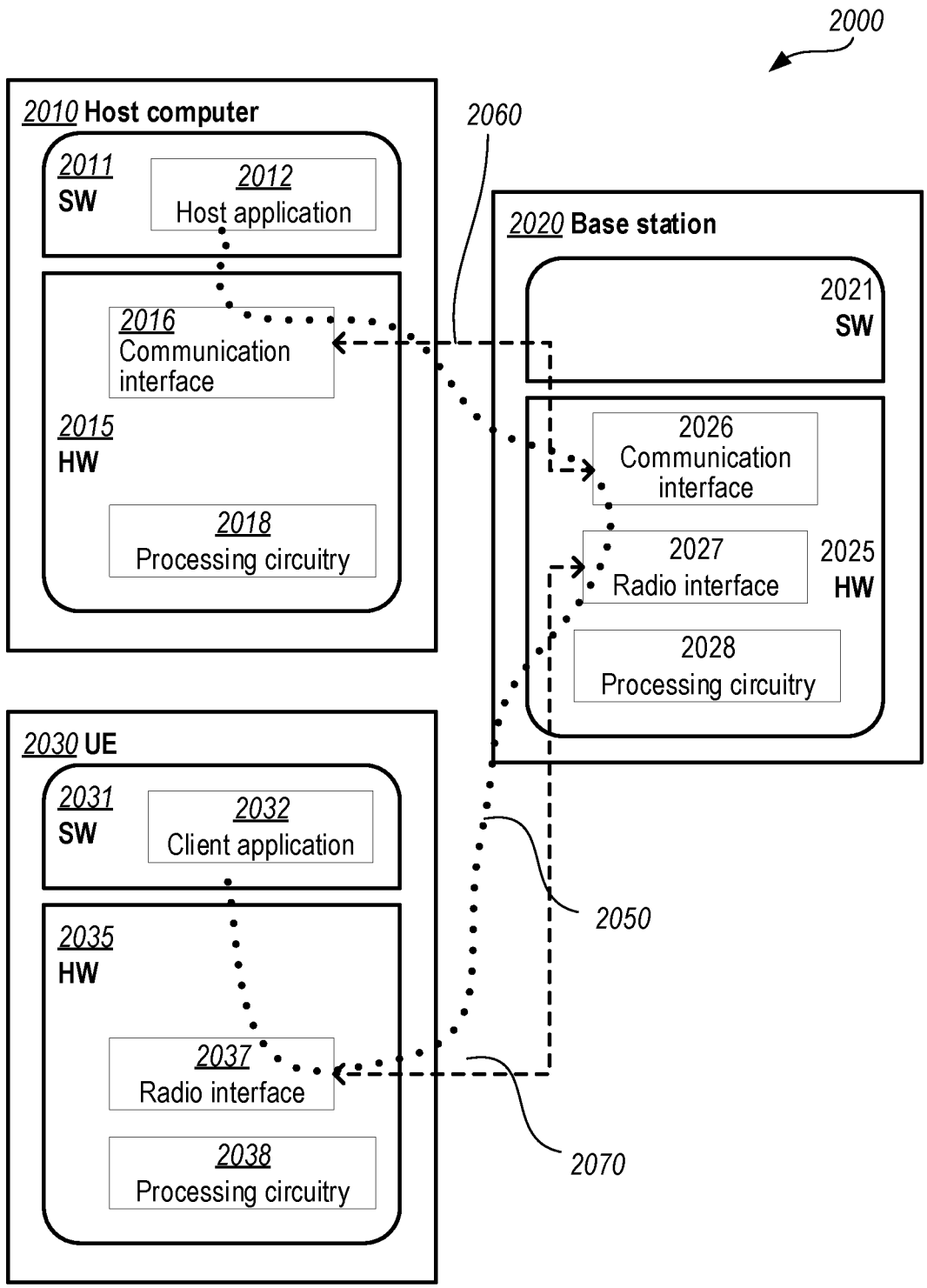

It is noted that host computer 2010, base station 2020 and UE 2030 illustrated in FIG. 20 can be similar or identical to host computer 1230, one of base stations 1612*a*, 1612*b*, 1612*c* and one of UEs 1691, 1692 of FIG. 16, respectively. This is to say, the inner workings of these entities can be as shown in FIG. 20 and independently, the surrounding network topology can be that of FIG. 16.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure can determine the routing, which it can be configured to hide from UE 2030 or from the service provider operating host computer 2010, or both. While OTT connection 2050 is active, the network infrastructure can further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2050 between host computer 2010 and UE 2030, in response to variations in the measurement results. The measurement procedure and/or the network functionality for reconfiguring OTT connection 2050 can be implemented in software 2011 and hardware 2015 of host computer 2010 or in software 2031 and hardware 2035 of UE 2030, or both. In embodiments, sensors (not shown) can be deployed in or in association with communication devices through which OTT connection 2050 passes; the sensors can participate in the measurement procedure by supplying values of the monitored quantities exemplified above, or supplying values of other physical quantities from which software 2011, 2031 can compute or estimate the monitored quantities. The reconfiguring of OTT connection 2050 can include message format, retransmission settings, preferred routing etc.; the reconfiguring need not affect base station 2020, and it can be unknown or imperceptible to base station 2020. Such procedures and functionalities can be known and practiced in the art. In certain embodiments, measurements can involve proprietary UE signaling facilitating host computer 2010's measurements of throughput, propagation times, latency and the like. The measurements can be implemented in that software 2011 and 2031 causes messages to be transmitted, in particular empty or 'dummy' messages, using OTT connection 2050 while it monitors propagation times, errors, etc.

FIG. 21 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 21 will be included in this section. In step 2110, the host computer provides user data. In substep 2111 (which can be optional) of step 2110, the host computer provides the user data by executing a host application. In step 2120, the host computer initiates a transmission carrying the user data to the UE. In step 2130 (which can be optional), the base station transmits to the UE the user data which was carried in the transmission that the host computer initiated, in accordance with the teachings of the embodiments described throughout this disclosure. In step 2140 (which can also be optional), the UE executes a client application associated with the host application executed by the host computer.

FIG. 22 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission can pass via the base station, in accordance with the teachings of the embodiments described throughout this disclosure. In step 2230 (which can be optional), the UE receives the user data carried in the transmission.

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 (which can be optional), the UE receives input data provided by the host computer. Additionally or alternatively, in step 2320, the UE provides user data. In substep 2321 (which can be optional) of step 2320, the UE provides the user data by executing a client application. In substep 2311 (which can be optional) of step 2310, the UE executes a client application which provides the user data in reaction to the received input data provided by the host computer. In providing the user data, the executed client application can further consider user input received from the user. Regardless of the specific manner in which the user data was provided, the UE initiates, in substep 2330 (which can be optional), transmission of the user data to the host computer. In step 2340 of the method, the host computer receives the user data transmitted from the UE, in accordance with the teachings of the embodiments described throughout this disclosure.

FIG. 24 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 24 will be included in this section. In step 2410 (which can be optional), in accordance with the teachings of the embodiments described throughout this disclosure, the base station receives user data from the UE. In step 2420 (which can be optional), the base station initiates transmission of the received user data to the host computer. In step 2430 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

1. A method performed by a user equipment (UE) for conditional mobility in a radio access network (RAN), the method comprising:
   receiving, from the RAN, one or more mobility-related messages comprising:
   a first indication of a mobility operation;
   a second indication of a triggering condition for the mobility operation;
   a second measurement configuration related to a source cell; and
   a third measurement configuration related to one or more target cells;
   detecting the triggering condition with respect to one of the target cells based on the second measurement configuration; and
   executing the mobility operation, towards the target cell, based on the third measurement configuration.
2. The method of embodiment 1, wherein detecting the triggering event comprises performing second measurements in the source cell based on the second measurement configuration.
3. The method of any of embodiments 1-2, wherein receiving the conditional mobility command further comprises storing the second and third measurement configurations.
4. The method of any of embodiments 1-3, wherein executing the mobility operation comprises one or more of the following operations:
   stop performing measurements in the source cell;
   deleting a stored second measurement configuration; and
   performing and reporting third measurements in the target cell based on the third measurement configuration.
5. The method of any of embodiments 1-4, further comprising receiving, from a source node serving the UE, a first measurement configuration.
6. The method of embodiment 5, further comprising performing and reporting first measurements in the source cell based on the first measurement configuration.
7. The method of any of embodiments 5-6, wherein receiving the first measurement configuration comprises storing the first measurement configuration.
8. The method of any of embodiments 5-7, wherein:
   the third measurement configuration is received as a complete measurement configuration; and
   executing the mobility operation further comprises replacing a stored first measurement configuration with the third measurement configuration.
9. The method of any of embodiments 5-7, wherein at least one of the following conditions applies:
   the second measurement configuration is received as a delta with respect to the first measurement configuration;
   the third measurement configuration is received as a delta with respect to the first measurement configuration; and
   the third measurement configuration is received as a delta with respect to the first and the second measurement configurations.
10. The method of any of embodiments 1-9, wherein the one or more mobility-related messages comprise a conditional mobility command, received from a source node, comprising the first and second indications and the second and third measurement configurations.
11. The method of embodiment 1-9, wherein the one or more mobility-related messages include:
    a conditional mobility command, received from a source node, including the first and second indications and the second measurement configuration, and
    a reconfiguration message, received from a target node, comprising the third measurement configuration.

12. The method of embodiment 11, wherein executing the mobility operation based on the third configuration comprises:
performing and reporting third measurements in the target cell based on the second measurement configuration; and
subsequently receiving the reconfiguration message comprising the third measurement configuration.
13. A method, performed by a source node, for conditional mobility of a user equipment (UE) in a radio access network (RAN), the method comprising:
sending, to a target node, a request to accept a conditional mobility operation related to the UE;
receiving, from the target node, a confirmation of the conditional mobility operation, the confirmation including a third measurement configuration related to one or more target cells served by the target node;
determining a second measurement configuration related to a triggering condition for the conditional mobility operation; and
sending, to the UE, a conditional mobility command comprising:
an indication of the mobility operation;
an indication of the triggering condition; and
the second measurement configuration.
14. The method of embodiment 13, wherein the conditional mobility command also includes the third measurement configuration.
15. The method of embodiment 13, further comprising sending the second measurement configuration to the target node.
16. The method of any of embodiments 13-15, further comprising sending, to the UE, a first measurement configuration related to a source cell, wherein the request to the target node also includes the first measurement configuration.
17. The method of any of embodiments 13-16, further comprising determining that a conditional mobility operation is required for the UE.
18. The method of any of embodiments 16-17, wherein determining that a conditional mobility operation is required comprises receiving first measurements made by the UE based on the first measurement configuration.
19. The method of any of embodiments 11-18, further comprising receiving, from the target node, an indication that the conditional mobility operation has been executed.
20. The method of any of embodiments 11-19, wherein sending the first measurement configuration comprises storing the first measurement configuration.
21. The method of any of embodiments 11-20, wherein determining the second measurement configuration comprises storing the second measurement configuration.
22. The method of any of embodiments 11-21, further comprising deleting stored first and second measurement configurations.
23. The method of any of embodiments 11-22, wherein at least one of the following conditions applies:
the second measurement configuration is determined as a delta with respect to the first measurement configuration;
the third measurement configuration is received as a delta with respect to the first measurement configuration; and
the third measurement configuration is received as a delta with respect to the first and the second measurement configurations.
24. A method, performed by a target node, for conditional mobility of a user equipment (UE) in a radio access network (RAN), the method comprising:
receiving, from a source node, a request to accept a conditional mobility operation related to the UE, the request including a first measurement configuration for the UE;
based on the first measurement configuration, determining a third measurement configuration for the UE in relation to one or more target cells served by the target node;
sending, to the source node, a confirmation of the conditional mobility operation, the confirmation including the third measurement configuration; and
executing the conditional mobility operation with the UE in one of the target cells, based on the third measurement configuration.
25. The method of embodiment 24, further comprising sending, to the source node, an indication that the conditional mobility operation has been executed.
26. The method of any of embodiments 24-25, wherein the third measurement configuration is sent as a delta with respect to the first measurement configuration.
27. The method of any of embodiments 24-25, wherein the third measurement configuration is sent as a complete measurement configuration.
28. The method of any of embodiments 24-27, wherein executing the conditional mobility operation comprises receiving measurements made by the UE in one of the target cells based on the third measurement configuration.
29. The method of any of embodiments 24-27, wherein executing the conditional mobility operation comprises:
receiving measurements made by the UE in one of the target cells based on the second measurement configuration; and
subsequently sending, to the UE, a reconfiguration message comprising the third measurement configuration.
30. The method of embodiment 29, further comprising receiving, from the source node, a second measurement configuration for the UE, wherein the second measurement configuration is received as a delta to the first measurement configuration.
31. The method of embodiment 30, wherein the third measurement configuration is sent as a delta with respect to the first and second measurement configurations.
32. A user equipment (UE) configured to support conditional mobility in a radio access network (RAN), the UE comprising:
communication circuitry configured to communicate with one or more network nodes in the RAN;
processing circuitry operably coupled to the communication circuitry and configured to perform operations corresponding to any of the methods of embodiments 1-12.
33. A user equipment (UE) configured to support conditional mobility in a radio access network (RAN), the UE being arranged to perform operations corresponding to any of the methods of embodiments 1-12.
34. A non-transitory, computer-readable medium storing computer-executable instructions that, when executed by processing circuitry comprising a user equipment (UE), configure the UE to perform operations corresponding to any of the methods of claims 1-12.

35. A network node in a radio access network (RAN), comprising:
    communication circuitry configured to communicate with one or more other network nodes and one or more user equipment (UE);
    processing circuitry operably coupled to the communication circuitry and configured to perform operations corresponding to any of the methods of embodiments 13-31.

36. A network node configured to support conditional mobility of user equipment (UEs) among cells in a radio access network (RAN), the network node being arranged to perform operations corresponding to any of the methods of embodiments 13-31.

37. A non-transitory, computer-readable medium storing computer-executable instructions that, when executed by processing circuitry comprising a network node in radio access network (RAN), configure the network node to perform operations corresponding to any of the methods of claims 13-31.

38. A communication system including a host computer, the host computer comprising:
    a. processing circuitry configured to provide user data; and
    b. a communication interface configured to forward the user data to a cellular network for transmission to a user equipment (UE) through a core network (CN) and a radio access network (RAN);
    wherein:
    c. the RAN comprises first and second nodes;
    d. the first node comprises a communication transceiver and processing circuitry configured to perform operations corresponding to any of the methods of embodiments 1-13; and
    e. the second node comprises a communication transceiver and processing circuitry configured to perform operations corresponding to any of the methods of embodiments 14-20.

39. The communication system of the previous embodiment, further comprising the UE.

40. The communication system of any of the previous two embodiments, wherein:
    f. the processing circuitry of the host computer is configured to execute a host application, thereby providing the user data; and
    g. the UE comprises processing circuitry configured to execute a client application associated with the host application.

41. A method implemented in a communication system including a host computer, a cellular network, and a user equipment (UE), the method comprising:
    a. at the host computer, providing user data;
    b. at the host computer, initiating a transmission carrying the user data to the UE via a cellular network comprising an radio access network (RAN); and
    c. operations, performed by first and second nodes of the RAN, corresponding to any of the methods of embodiments 1-20.

42. The method of the previous embodiment, wherein the data message comprises the user data, and further comprising transmitting the user data to the UE via the first node or the second node.

43. The method of any of the previous two embodiments, wherein the user data is provided at the host computer by executing a host application, the method further comprising, at the UE, executing a client application associated with the host application.

44. A communication system including a host computer comprising a communication interface configured to receive user data originating from a transmission from a user equipment (UE) via a first node or a second node in a radio access network (RAN), wherein:
    a. the first node comprises a communication interface and processing circuitry configured to perform operations corresponding to any of the methods of embodiments 1-13; and
    b. the second node comprises a communication interface and processing circuitry configured to perform operations corresponding to any of the methods of embodiments 14-20.

45. The communication system of the previous embodiment, further including the UE.

46. The communication system of any of the previous two embodiments, wherein:
    c. the processing circuitry of the host computer is configured to execute a host application;
    d. the UE is configured to execute a client application associated with the host application, thereby providing the user data to be received by the host computer.

The invention claimed is:

1. A method for conditional mobility handover (CHO) in a radio access network (RAN), wherein the method is performed by a user equipment (UE) and comprises:
    receiving, from a source RAN node, a CHO command comprising:
        a first indication of a mobility operation CHO,
        a second indication of a triggering condition for the CHO,
        a second measurement configuration related to the triggering condition, and
        a third measurement configuration to be applied by the UE after execution of the CHO to any of one or more target cells;
    based on the second measurement configuration, detecting fulfillment of the triggering condition with respect to a particular one of the target cells and executing the CHO towards the particular target cell;
    after execution of the CHO by the UE towards the particular target cell, applying the third measurement configuration to the particular target cell; and
    subsequently performing third measurements in the particular target cell based on the third measurement configuration and reporting the third measurements.

2. The method of claim 1, wherein detecting fulfillment of the triggering condition comprises performing second measurements of the UE's source cell and the one or more target cells based on the second measurement configuration.

3. The method of claim 1, wherein executing the CHO comprises one or more of the following operations:
    stop performing second measurements based on the second measurement configuration;
    deleting or releasing at least a portion of a stored second measurement configuration; and
    storing the third measurement configuration.

4. The method of claim 1, further comprising:
    receiving, from a source RAN node serving the UE's source cell, a first measurement configuration related to the UE's source cell;
    storing the first measurement configuration; and based on the first measurement configuration, performing and reporting first measurements in the UE's source cell before receiving the CHO command.

5. The method of claim 4, wherein receiving the CHO command comprises storing at least a portion of the second measurement configuration and the third measurement configuration separately from the first measurement configuration.

6. The method of claim 4, wherein:
the third measurement configuration is received as a complete measurement configuration; and
executing the CHO further comprises replacing a stored first measurement configuration with the third measurement configuration.

7. The method of claim 4, wherein:
the third measurement configuration is received as a delta with respect to one or more of the first measurement configuration and the second measurement configuration; and
executing the CHO comprises determining a measurement configuration, for the third measurements, based on the third measurement configuration and one or more of the first measurement configuration and the second measurement configuration.

8. The method of claim 1, wherein:
the second and third measurement configurations include respective measurement configurations for each target cell that is a candidate for the indicated CHO.

9. A method for conditional handover (CHO) of a user equipment (UE) in a radio access network (RAN), wherein the method is performed by a source RAN node and comprises:
sending, to a target RAN node, a request to accept a CHO related to the UE;
receiving, from the target RAN node, a confirmation of the CHO, the confirmation including a third measurement configuration related to one or more target cells served by the target RAN node, the third measurement configuration to be applied by the UE after an execution of the CHO to any of the one or more target cells;
determining a second measurement configuration related to a triggering condition for the CHO; and
sending, to the UE, a mobility-related message comprising:
a first indication of the CHO;
a second indication of the triggering condition;
the second measurement configuration; and
the third measurement configuration,
wherein the second and third measurement configurations include respective measurement configurations, to be applied by the UE, for each target cell that is a candidate for the CHO indicated by the first indication.

10. The method of claim 9, wherein determining the second measurement configuration further comprises sending the second measurement configuration to the target RAN node.

11. The method of claim 9, further comprising:
sending, to the UE, a first measurement configuration related to a source cell served by the source RAN node; and
receiving first measurements made by the UE in the source cell based on the first measurement configuration; and
determining that the CHO is required based on the first measurements.

12. The method of claim 11, wherein the request for the target RAN node to accept the CHO also includes the first measurement configuration.

13. The method of claim 11, wherein:
sending the first measurement configuration comprises storing the first measurement configuration; and
determining the second measurement configuration comprises storing the second measurement configuration separately from the first measurement configuration.

14. The method of claim 13, further comprising:
receiving, from the target RAN node, a third indication that the CHO has been completed; and
in response to the third indication, deleting or releasing at least a portion of the stored first and second measurement configurations.

15. The method of claim 9, wherein at least one of the following conditions applies:
the second measurement configuration is determined as a delta with respect to the first measurement configuration;
the third measurement configuration is received as a delta with respect to the first measurement configuration; and
the third measurement configuration is received as a delta with respect to the first and the second measurement configurations.

16. A method for conditional handover (CHO) of a user equipment (UE) in a radio access network (RAN), wherein the method is performed by a target RAN node and comprises:
receiving, from a source RAN node, a request to accept a CHO related to the UE, the request including a first measurement configuration for the UE;
based on the first measurement configuration, determining a third measurement configuration for the UE in relation to one or more target cells served by the target RAN node, wherein the third measurement configuration is to be applied by the UE after execution of the CHO to any of the one or more target cells;
sending, to the source RAN node, a confirmation of the requested CHO, the confirmation including the third measurement configuration; and
receiving, from the UE, measurements made in a particular one of the target cells based on the third measurement configuration, which was applied by the UE in the target cell after the UE applied a second measurement configuration in the source cell to detect a triggering condition for the CHO.

17. The method of claim 16, further comprising sending, to the source RAN node, an indication that the CHO has been completed.

18. The method of claim 16, wherein the third measurement configuration, included with the confirmation, is one of the following:
a delta with respect to one or more of the first measurement configuration and the second measurement configuration; or
a complete measurement configuration.

19. A user equipment (UE) configured for conditional handover (CHO) in a radio access network (RAN), the UE comprising:
radio interface circuitry configured to communicate with one or more RAN nodes via one or more cells; and
processing circuitry operably coupled with the radio interface circuitry, whereby the processing circuitry and the radio interface circuitry are configured to perform operations corresponding to the method of claim 1.

20. A radio access network (RAN) node configured to facilitate conditional handover (CHO) for a user equipment (UE) in the RAN, the RAN node comprising:
- communication interface circuitry configured to communicate with a target RAN node for the UE; and
- processing circuitry operably coupled with the communication interface circuitry, whereby the processing circuitry and the communication interface circuitry are configured to perform operations corresponding to the method of claim 9.

21. A radio access network (RAN) node configured to facilitate conditional handover (CHO) for a user equipment (UE) in the RAN, the RAN node comprising:
- communication interface circuitry configured to communicate with a source RAN node for the UE; and
- processing circuitry operably coupled with the communication interface circuitry, whereby the processing circuitry and the communication interface circuitry are configured to perform operations corresponding to the method of claim 16.

* * * * *

UNITED STATES PATENT AND TRADEMARK OFFICE
CERTIFICATE OF CORRECTION

PATENT NO. : 12,082,068 B2
APPLICATION NO. : 17/426271
DATED : September 3, 2024
INVENTOR(S) : Eklöf et al.

Page 1 of 1

It is certified that error appears in the above-identified patent and that said Letters Patent is hereby corrected as shown below:

In the Specification

In Column 11, Line 65, delete "LI" and insert -- UL --, therefor.

In Column 13, Line 30, delete "(MMES)" and insert -- (MMEs) --, therefor.

In Column 19, Line 30, delete "exist" and insert -- exist: --, therefor.

In Column 22, Line 67, delete "RRCCondilionalReconfiguration)" and insert -- RRCConditionalReconfiguration) --, therefor.

In Column 35, Line 5, delete "measConfig)" and insert -- measConfig') --, therefor.

In Column 36, Line 22, delete "equipment to" and insert -- equipment --, therefor.

In Column 38, Line 41, delete "to to" and insert -- to --, therefor.

In Column 39, Line 26, delete "node to" and insert -- node --, therefor.

In the Claims

In Column 58, Line 29, in Claim 1, delete "conditional mobility handover (CHO)" and insert -- conditional handover (CHO) --, therefor.

Signed and Sealed this
Twenty-second Day of April, 2025

Coke Morgan Stewart
*Acting Director of the United States Patent and Trademark Office*